(12) United States Patent  (10) Patent No.: US 9,218,838 B2
Biskeborn et al.  (45) Date of Patent: Dec. 22, 2015

(54) QUASI-STATICALLY TILTED HEAD HAVING OFFSET READER/WRITER TRANSDUCER PAIRS

(71) Applicant: International Business Machines Corporation, Armonk, NY (US)

(72) Inventors: Robert G. Biskeborn, Hollister, CA (US); Calvin S. Lo, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/105,082

(22) Filed: Dec. 12, 2013

(65) Prior Publication Data

US 2015/0170691 A1   Jun. 18, 2015

(51) Int. Cl.
  *G11B 5/584* (2006.01)
  *G11B 5/48* (2006.01)
  *G11B 15/26* (2006.01)

(52) U.S. Cl.
  CPC .............. *G11B 5/584* (2013.01); *G11B 5/4893* (2013.01); *G11B 15/26* (2013.01)

(58) Field of Classification Search
  None
  See application file for complete search history.

(56) References Cited

U.S. PATENT DOCUMENTS

| | | |
|---|---|---|
| 3,893,176 A | 7/1975 | Jones |
| 3,924,268 A | 12/1975 | McIntosh et al. |
| 3,943,566 A | 3/1976 | Brock et al. |
| 4,539,615 A | 9/1985 | Arai et al. |
| 4,752,846 A | 6/1988 | Proehl |
| 4,821,129 A | 4/1989 | Culp |
| 4,922,352 A | 5/1990 | Culp |
| 5,060,210 A | 10/1991 | Fennema et al. |
| 5,307,217 A | 4/1994 | Saliba |
| 5,371,638 A | 12/1994 | Saliba |
| 5,680,278 A | 10/1997 | Sawtelle, Jr. |
| 5,684,656 A | 11/1997 | Jung |
| 5,854,726 A * | 12/1998 | Kubota et al. ................. 360/121 |
| 5,862,014 A | 1/1999 | Nute |
| 5,867,339 A | 2/1999 | Panish et al. |
| 5,883,760 A | 3/1999 | Yamada et al. |
| 6,038,108 A | 3/2000 | Dee et al. |
| 6,088,184 A | 7/2000 | Hu |
| 6,130,804 A | 10/2000 | Panish et al. |
| 6,188,532 B1 | 2/2001 | Albrecht et al. |
| 6,188,535 B1 | 2/2001 | Lemke et al. |
| 6,222,698 B1 | 4/2001 | Barndt et al. |
| 6,275,350 B1 | 8/2001 | Barndt |

(Continued)

FOREIGN PATENT DOCUMENTS

| | | |
|---|---|---|
| CN | 1920954 A | 2/2007 |
| CN | 101149931 A | 3/2008 |

(Continued)

OTHER PUBLICATIONS

Biskeborn et al., U.S. Appl. No. 14/316,696, filed Jun. 26, 2014.

(Continued)

*Primary Examiner* — Wayne Young
*Assistant Examiner* — James L Habermehl
(74) *Attorney, Agent, or Firm* — Zilka-Kotab, PC

(57) ABSTRACT

Aspects of the present invention relates generally to apparatuses with transducer arrays having offset transducers. Various embodiments are particularly suited to tilting for tape dimensional instability compensation. Some embodiments include dual servo readers in a given array.

20 Claims, 15 Drawing Sheets

(56) References Cited

U.S. PATENT DOCUMENTS

| | | |
|---|---|---|
| 6,307,718 B1 | 10/2001 | Kasetty |
| 6,339,793 B1 | 1/2002 | Bostian et al. |
| 6,369,982 B2 | 4/2002 | Saliba |
| 6,650,496 B2 | 11/2003 | Nozieres et al. |
| 6,751,055 B1 | 6/2004 | Alfoqaha et al. |
| 6,757,128 B2 | 6/2004 | Yip |
| 6,781,784 B2 | 8/2004 | Peterson |
| 6,947,247 B2 | 9/2005 | Schwarz et al. |
| 6,965,490 B2 | 11/2005 | Ito |
| 7,009,812 B2 | 3/2006 | Hsu et al. |
| 7,054,093 B1 | 5/2006 | Anderson et al. |
| 7,142,388 B2 | 11/2006 | Tateishi et al. |
| 7,193,812 B2 | 3/2007 | Eaton |
| 7,239,465 B1 | 7/2007 | Watson et al. |
| 7,253,986 B2 | 8/2007 | Berman et al. |
| 7,342,738 B1 | 3/2008 | Anderson et al. |
| 7,428,120 B2 | 9/2008 | Berman et al. |
| 7,474,488 B2 | 1/2009 | Czarnecki et al. |
| 7,480,117 B2 | 1/2009 | Biskeborn et al. |
| 7,486,464 B2 | 2/2009 | Saliba |
| 7,681,793 B2 | 3/2010 | Biskeborn et al. |
| 7,724,459 B2 | 5/2010 | Czarnecki et al. |
| 7,764,460 B2 | 7/2010 | Bates et al. |
| 7,766,236 B2 | 8/2010 | Biskeborn et al. |
| 7,889,454 B2 | 2/2011 | Johnson et al. |
| 7,952,832 B2 | 5/2011 | Biskeborn et al. |
| 8,004,792 B2 | 8/2011 | Biskeborn et al. |
| 8,045,290 B2 | 10/2011 | McKinstry et al. |
| 8,054,576 B2 | 11/2011 | Bui et al. |
| 8,054,579 B2 | 11/2011 | Biskeborn |
| 8,094,402 B2 | 1/2012 | Bui et al. |
| 8,130,467 B2 | 3/2012 | Biskeborn et al. |
| 8,154,811 B2 * | 4/2012 | Barsotti et al. ................. 360/31 |
| 8,265,487 B2 | 9/2012 | Schunk |
| 8,587,902 B2 | 11/2013 | Biskeborn et al. |
| 8,599,508 B1 | 12/2013 | Burd |
| 8,687,324 B2 | 4/2014 | Biskeborn et al. |
| 8,773,795 B1 * | 7/2014 | Biskeborn ....................... 360/75 |
| 8,797,682 B1 | 8/2014 | Biskeborn et al. |
| 8,810,957 B1 | 8/2014 | Biskeborn et al. |
| 8,902,528 B1 | 12/2014 | Biskeborn et al. |
| 8,976,482 B2 * | 3/2015 | Cherubini et al. ......... 360/77.12 |
| 9,007,712 B1 | 4/2015 | Biskeborn et al. |
| 2001/0015870 A1 | 8/2001 | Saliba |
| 2002/0034042 A1 | 3/2002 | Hungerford et al. |
| 2002/0163752 A1 | 11/2002 | Peterson |
| 2002/0186496 A1 | 12/2002 | Saliba et al. |
| 2004/0223248 A1 | 11/2004 | Dugas et al. |
| 2005/0068671 A1 | 3/2005 | Hsu et al. |
| 2005/0152067 A1 | 7/2005 | Yip et al. |
| 2005/0157422 A1 | 7/2005 | Dugas et al. |
| 2005/0168865 A1 | 8/2005 | Simmons, Jr. et al. |
| 2005/0259364 A1 | 11/2005 | Yip |
| 2006/0039082 A1 | 2/2006 | Biskeborn et al. |
| 2006/0126207 A1 | 6/2006 | Johnson et al. |
| 2006/0126212 A1 | 6/2006 | Anderson et al. |
| 2006/0232884 A1 | 10/2006 | Biskeborn |
| 2007/0047146 A1 | 3/2007 | Biskeborn et al. |
| 2007/0242378 A1 | 10/2007 | Ikegami et al. |
| 2007/0285838 A1 | 12/2007 | Hennecken et al. |
| 2008/0068750 A1 | 3/2008 | Biskeborn et al. |
| 2008/0088963 A1 | 4/2008 | Biskeborn et al. |
| 2008/0137235 A1 | 6/2008 | Biskeborn et al. |
| 2008/0158720 A1 | 7/2008 | Watson |
| 2008/0273258 A1 | 11/2008 | Berman et al. |
| 2008/0285167 A1 | 11/2008 | Biskeborn et al. |
| 2008/0291566 A1 | 11/2008 | Biskeborn et al. |
| 2009/0027803 A1 | 1/2009 | Biskeborn et al. |
| 2009/0128949 A1 | 5/2009 | Matsuno et al. |
| 2009/0174963 A1 | 7/2009 | Liang et al. |
| 2009/0213493 A1 | 8/2009 | Bui et al. |
| 2009/0219648 A1 | 9/2009 | Jaquette |
| 2009/0231756 A1 | 9/2009 | Koeppe |
| 2009/0231757 A1 | 9/2009 | Biskeborn et al. |
| 2009/0279205 A1 | 11/2009 | Hennecken |
| 2009/0316296 A1 | 12/2009 | Cherubini et al. |
| 2010/0110587 A1 | 5/2010 | Biskeborn et al. |
| 2011/0002065 A1 | 1/2011 | Dugas et al. |
| 2011/0051283 A1 | 3/2011 | Harper et al. |
| 2011/0170214 A1 | 7/2011 | Bui et al. |
| 2011/0182157 A1 | 7/2011 | Hoerger |
| 2011/0199701 A1 | 8/2011 | Bui et al. |
| 2011/0310511 A1 | 12/2011 | Edelman et al. |
| 2012/0008234 A1 | 1/2012 | Biskeborn et al. |
| 2012/0050909 A1 | 3/2012 | Lantz et al. |
| 2012/0200952 A1 | 8/2012 | Bui et al. |
| 2012/0206832 A1 | 8/2012 | Hamidi et al. |
| 2013/0286502 A1 | 10/2013 | Erden et al. |
| 2014/0016226 A1 | 1/2014 | Bui et al. |
| 2014/0036393 A1 | 2/2014 | Biskeborn et al. |
| 2014/0153127 A1 | 6/2014 | Kawabe et al. |
| 2014/0192435 A1 | 7/2014 | Buch |
| 2014/0327983 A1 * | 11/2014 | Biskeborn et al. ............... 360/70 |
| 2014/0327984 A1 | 11/2014 | Biskeborn et al. |
| 2014/0327987 A1 | 11/2014 | Biskeborn et al. |
| 2014/0334033 A1 | 11/2014 | Biskeborn et al. |
| 2015/0043101 A1 * | 2/2015 | Biskeborn et al. ............... 360/52 |
| 2015/0062742 A1 | 3/2015 | Biskeborn et al. |
| 2015/0077880 A1 | 3/2015 | Biskeborn et al. |

FOREIGN PATENT DOCUMENTS

| | | |
|---|---|---|
| CN | 101202050 A | 6/2008 |
| EP | 0 478 276 A2 | 9/1991 |
| EP | 0 883 120 A1 | 12/1998 |
| EP | 0 959 454 A2 | 11/1999 |
| EP | 1 030 300 A2 | 1/2000 |
| EP | 1 204 096 A2 | 10/2001 |
| JP | 2005/108412 A | 4/2005 |
| JP | 2006/172705 A | 6/2006 |
| JP | 2008146818 A | 6/2008 |
| JP | 5043615 B2 | 10/2012 |
| KR | 1997050174 | 7/1997 |
| WO | 2007/093107 A1 | 8/2007 |
| WO | 2009/141231 A2 | 11/2009 |
| WO | 2010/047679 A1 | 4/2010 |
| WO | 2011/067052 A1 | 6/2011 |

OTHER PUBLICATIONS

Wright, A. E., "Effects of Operating Parameters on Lateral Tape Motion for Magnetic Tape in an Advanced Linear Tape Drive," Thesis, The Ohio State Univ., 2006, pp. 1-104.

Argumedo et al., "Scaling tape-recording areal densities to 100 Gb/in2," 2008 IBM, IBM Journal of Research & Development, vol. 52, No. 4/5, Jul./Sep. 2008, pp. 513-527.

Childers et al., "Six orders of magnitude in linear tape technology: The one-terabyte project," IBM Journal of Research & Development, vol. 47, No. 4, Jul. 2003, pp. 471-482.

Biskeborn et al., "2.4 Tape Head Technology," International Magnetic Tape Storage Roadmap, May 2012, pp. 107-128.

Goldade et al., "Tape edge study in a linear tape drive with single-flanged guides," Journal of Magnetism and Magnetic Materials, vol. 271, 2004, pp. 409-430.

Beuch, We, "Magnetic Read Write Head Carriage Adjustment Procedure," IPCOM000071116D, Dec. 1, 1978, pp. 1-3.

Cherubini et al., "Control Methods in Data-Storage Systems," IEEE Transactions on Control Systems Technology, vol. 20, Issue 2, Mar. 2012, pp. 296-322, abstract only.

U.S. Appl. No. 14/108,229, filed Dec. 16, 2013.
U.S. Appl. No. 13/875,226, filed May 1, 2013.
U.S. Appl. No. 13/875,230, filed May 1, 2013.
U.S. Appl. No. 13/875,231, filed May 1, 2013.
U.S. Appl. No. 13/890,155, filed May 8, 2013.
U.S. Appl. No. 13/972,790, filed Aug. 21, 2013.
U.S. Appl. No. 14/019,405, filed Sep. 5, 2013.

(56) References Cited

OTHER PUBLICATIONS

U.S. Appl. No. 14/028,444, filed Sep. 16, 2013.
International Search Report and Written Opinion from PCT Application No. PCT/IB2014/060706, dated Jan. 21, 2015.
Ditzel et al., "A Computer Method for the Automatic Reduction of Spectroscopic Data," Applied Optics, vol. 6, No. 12, Dec. 1967, pp. 2085-2090.
Biskeborn et al., U.S. Appl. No. 14/527,722, filed Oct. 29, 2014.
Biskeborn et al., U.S. Appl. No. 14/645,350, filed Mar. 11, 2015.

* cited by examiner

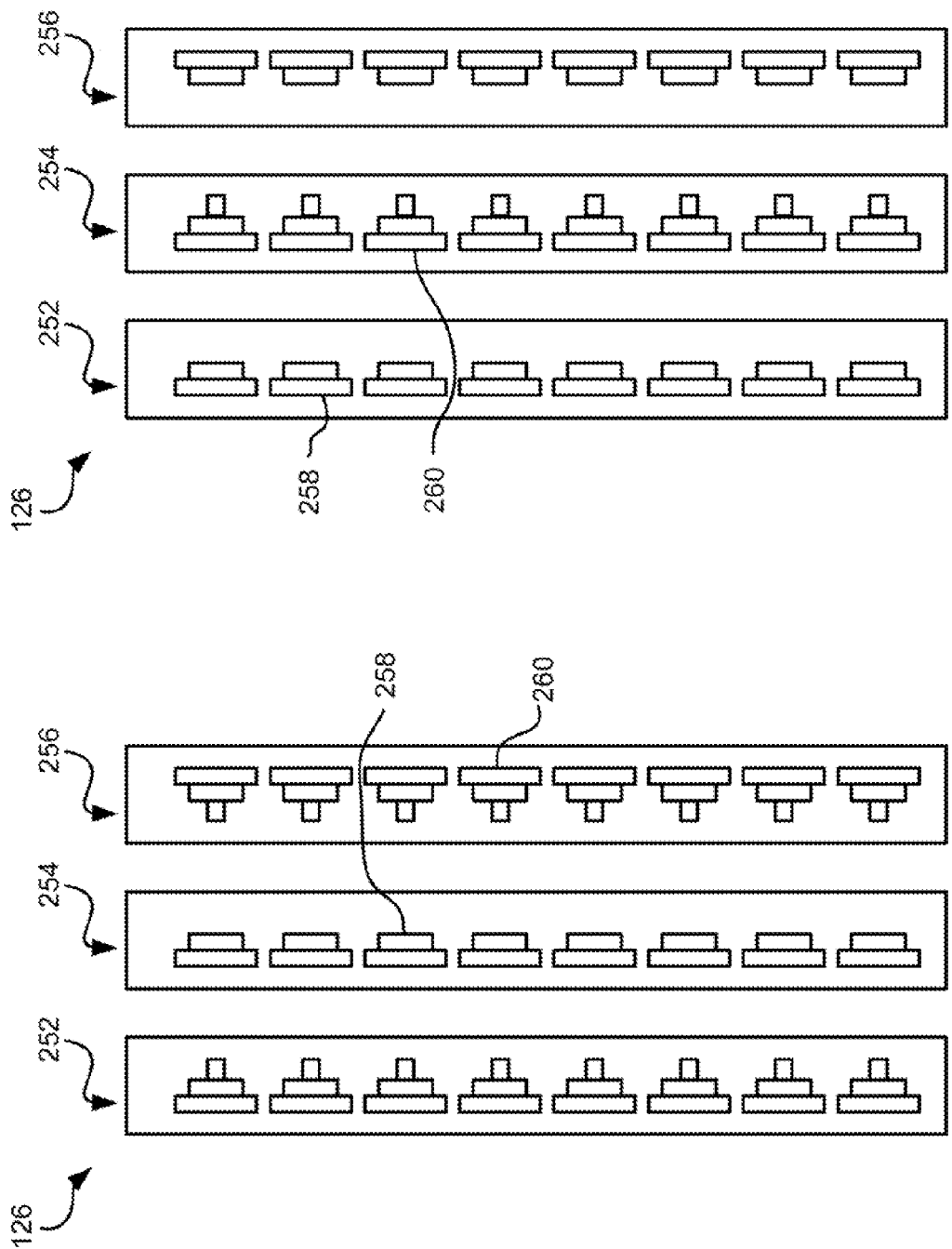

QUASI-STATICALLY TILTED HEAD HAVING OFFSET READER/WRITER TRANSDUCER PAIRS

BACKGROUND

The present invention relates to data storage systems, and more particularly, this invention relates to modules having arrays of offset reader/writer transducer pairs that are selectively tiltable relative to a magnetic medium, thereby enabling read while write capability.

In magnetic storage systems, data is read from and written onto magnetic recording media utilizing magnetic transducers. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, magnetic tape is moved over the surface of the tape head at high speed. Usually the tape head is designed to minimize the spacing between the head and the tape. The spacing between the magnetic head and the magnetic tape is crucial and so goals in these systems are to have the recording gaps of the transducers, which are the source of the magnetic recording flux in near contact with the tape to effect writing sharp transitions, and to have the read elements in near contact with the tape to provide effective coupling of the magnetic field from the tape to the read elements.

The quantity of data stored on a magnetic tape may be increased by increasing the number of data tracks across the tape. More tracks are made possible by reducing feature sizes of the readers and writers, such as by using thin-film fabrication techniques and MR sensors. However, for various reasons, the feature sizes of readers and writers cannot be arbitrarily reduced, and so factors such as lateral tape motion transients and tape lateral expansion and contraction (e.g., perpendicular to the direction of tape travel) must be balanced with reader/writer sizes that provide acceptable written tracks and readback signals. One issue limiting areal density is misregistration caused by tape lateral expansion and contraction. Tape width can vary by up to about 0.1% due to expansion and contraction caused by changes in humidity, tape tension, temperature, aging, etc. This is often referred to as tape dimensional instability (TDI).

If the tape is written in one environment and then read back in another, the TDI may prevent the spacing of the tracks on the tape from precisely matching the spacing of the reading elements during readback. In current products, the change in track spacing due to TDI is small compared to the size of the written tracks and is part of the tracking budget that is considered when designing a product. As the tape capacity increases over time, tracks are becoming smaller and TDI is becoming an increasingly larger portion of the tracking budget and this is a limiting factor for growing areal density.

BRIEF SUMMARY

An apparatus according to one embodiment includes at least two modules, each of the modules having: an array of transducers, the transducers in each array being arranged in pairs, wherein an axis of the array of transducers is defined between opposite ends thereof. The axis of the array of transducers is oriented at a nominal angle relative to a line oriented perpendicular to an intended direction of tape travel thereacross, the nominal angle being between 0.1° and about 10°. The axes of the arrays of the at least two modules are oriented about parallel to each other. A first transducer of each of the transducer pairs of a first of the modules is offset from a second of the transducers of each of the transducer pairs of the first module in a first direction parallel to the axes of the arrays. A first transducer of each of the transducer pairs of a second of the modules is offset from a second of the transducers of each of the transducer pairs of the second module in a second direction that is opposite the first direction. The first transducers of the transducer pairs of the second module are about aligned with the second transducers of the transducer pairs of the first module in the intended direction of tape travel, and the first transducers of the transducer pairs of the first module are about aligned with the second transducers of the transducer pairs of the second module in the intended direction of tape travel, when the arrays are oriented at the nominal angle.

An apparatus according to another embodiment includes a magnetic tape head having at least two modules, each of the modules having an array of transducers, the transducers in each array being arranged in pairs. Also included are a drive mechanism for passing a magnetic medium over the modules, and a controller electrically coupled to the modules. An axis of each array of transducers is defined between opposite ends thereof. The axis of each array of transducers is oriented at a nominal angle relative to a line oriented perpendicular to an intended direction of tape travel thereacross, the nominal angle being between 0.1° and about 10°. The axes of the arrays are oriented about parallel to each other. A first transducer of each of the transducer pairs of a first of the modules is offset from a second of the transducers of each of the transducer pairs of the first module in a first direction parallel to the axes of the arrays. A first transducer of each of the transducer pairs of a second of the modules is offset from a second of the transducers of each of the transducer pairs of the second module in a second direction that is opposite the first direction. The first transducers of the transducer pairs of the second module are about aligned with the second transducers of the transducer pairs of the first module in the intended direction of tape travel, and the first transducers of the transducer pairs of the first module are about aligned with the second transducers of the transducer pairs of the second module in the intended direction of tape travel, when the arrays are oriented at the nominal angle.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

FIG. 3 is a partial tape bearing surface view of a magnetic head having a write-read-write configuration.

FIG. 4 is a partial tape bearing surface view of a magnetic head having a read-write-read configuration.

DETAILED DESCRIPTION

Figure 1A:
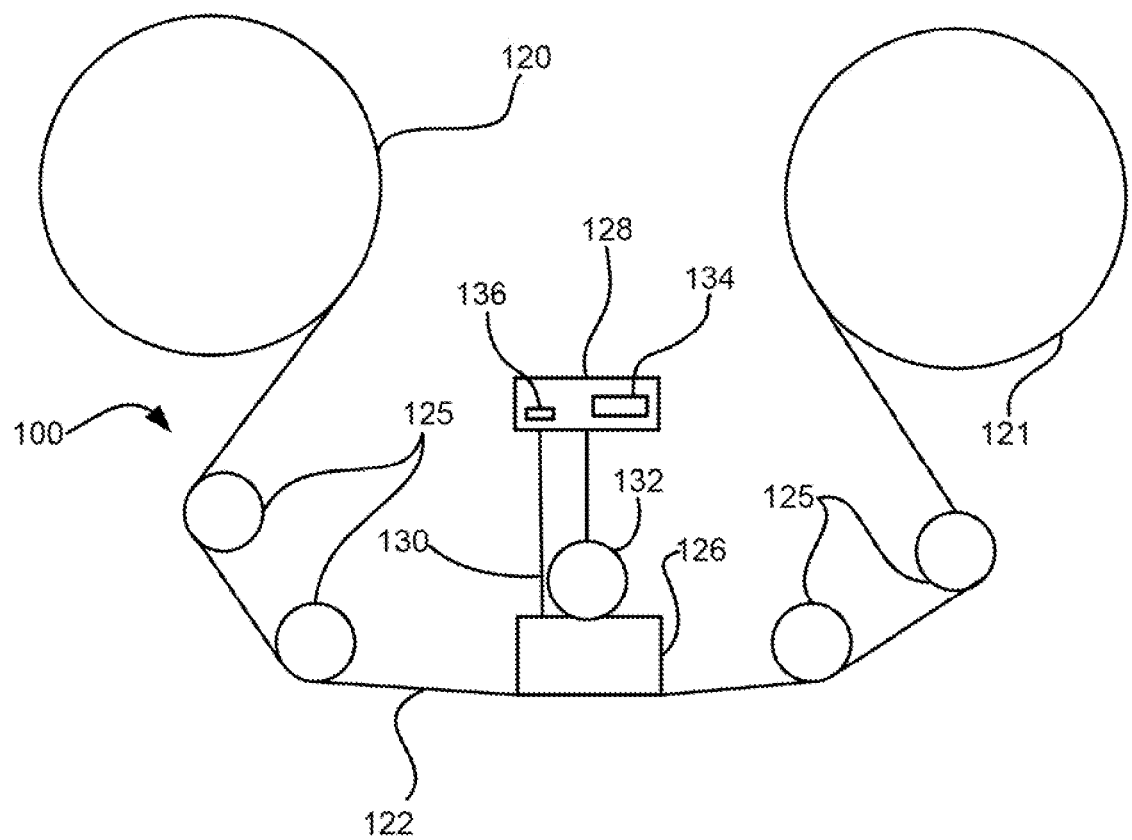
FIG. 1A is a schematic diagram of a simplified tape drive system according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems having arrays of offset reader/writer transducer pairs, as well as operation and/or component parts thereof. In various embodiments herein, the arrays of reader/writer transducer pairs may incorporate an offset between the transducers of each of the reader/writer transducer pairs along the axes of the arrays. Moreover, the offset reader/writer transducer pairs may be selectively tiltable, thereby enabling read while write capability despite potential changes in the dimensions and/or orientation of a tape being written to and/or having data read therefrom, as will be discussed in further detail below.

In one general embodiment, an apparatus includes at least two modules, each of the modules having: an array of transducers, the transducers in each array being arranged in pairs, wherein an axis of the array of transducers is defined between opposite ends thereof. The axis of the array of transducers is oriented at a nominal angle relative to a line oriented perpendicular to an intended direction of tape travel thereacross, the nominal angle being between 0.1° and about 10°. The axes of the arrays of the at least two modules are oriented about parallel to each other. A first transducer of each of the transducer pairs of a first of the modules is offset from a second of the transducers of each of the transducer pairs of the first module in a first direction parallel to the axes of the arrays. A first transducer of each of the transducer pairs of a second of the modules is offset from a second of the transducers of each of the transducer pairs of the second module in a second direction that is opposite the first direction. The first transducers of the transducer pairs of the second module are about aligned with the second transducers of the transducer pairs of the first module in the intended direction of tape travel, and the first transducers of the transducer pairs of the first module are about aligned with the second transducers of the transducer pairs of the second module in the intended direction of tape travel, when the arrays are oriented at the nominal angle.

In another general embodiment, an apparatus includes a magnetic tape head having at least two modules, each of the modules having an array of transducers, the transducers in each array being arranged in pairs. Also included are a drive mechanism for passing a magnetic medium over the modules, and a controller electrically coupled to the modules. An axis of each array of transducers is defined between opposite ends thereof. The axis of each array of transducers is oriented at a nominal angle relative to a line oriented perpendicular to an intended direction of tape travel thereacross, the nominal angle being between 0.1° and about 10°. The axes of the arrays are oriented about parallel to each other. A first transducer of each of the transducer pairs of a first of the modules is offset from a second of the transducers of each of the transducer pairs of the first module in a first direction parallel to the axes of the arrays. A first transducer of each of the transducer pairs of a second of the modules is offset from a second of the transducers of each of the transducer pairs of the second module in a second direction that is opposite the first direction. The first transducers of the transducer pairs of the second module are about aligned with the second transducers of the transducer pairs of the first module in the intended direction of tape travel, and the first transducers of the transducer pairs of the first module are about aligned with the second transducers of the transducer pairs of the second module in the intended direction of tape travel, when the arrays are oriented at the nominal angle.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the system 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may operate under logic known in the art, as well as any logic disclosed herein. The controller 128 may be coupled to a memory 136 of any known type, which may store instructions executable by the controller 128. Moreover, the controller 128 may be configured and/or programmable to perform or control some or all of the methodology presented herein. Thus, the controller may be considered configured to perform various operations by way of logic programmed into a chip; software, firmware, or other instructions being available to a processor; etc. and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (integral or external) to send and receive the data and for controlling the operation of the tape drive 100 and communicating the status of the tape drive 100 to the host, all as will be understood by those of skill in the art.

Figure 1B:
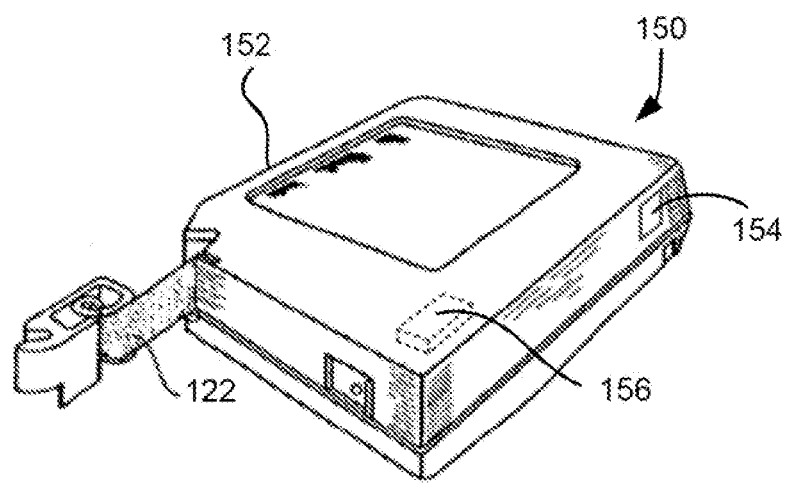
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some embodiments, the nonvolatile memory 156 may be embedded inside the housing 152, as shown in FIG. 1B. In more embodiments, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, ROM device, etc., embedded into or coupled to the inside or outside of the tape cartridge 150. The nonvolatile memory is accessible by the tape drive and the tape operating software (the driver software), and/or other device.

Figure 2:
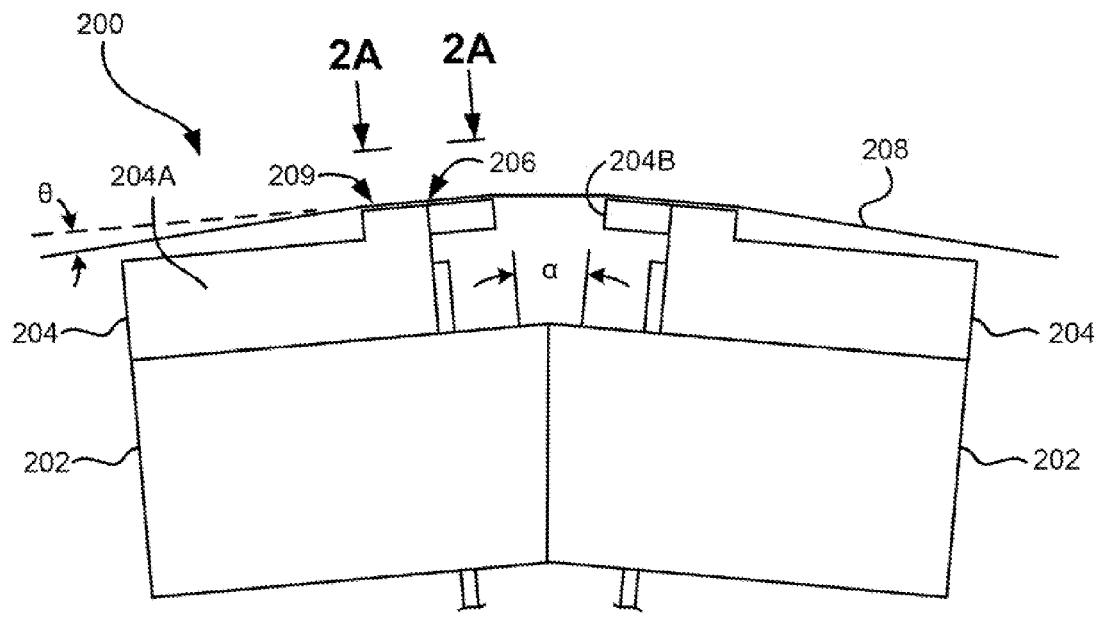
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2A:
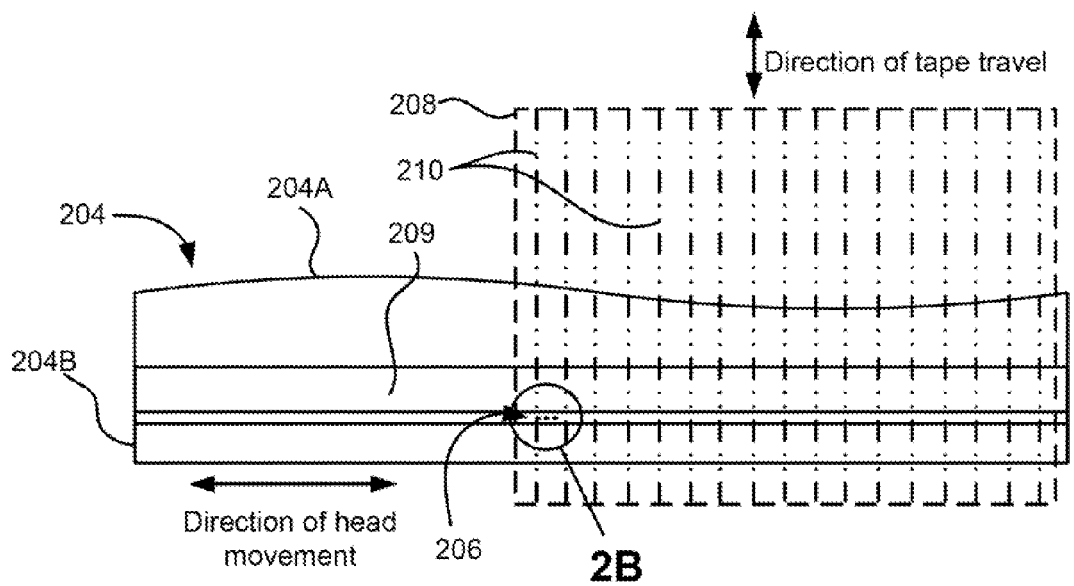
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4 to 22 data bands, e.g., with 8 data bands and 9 servo tracks 210, as shown in FIG. 2A on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2B:
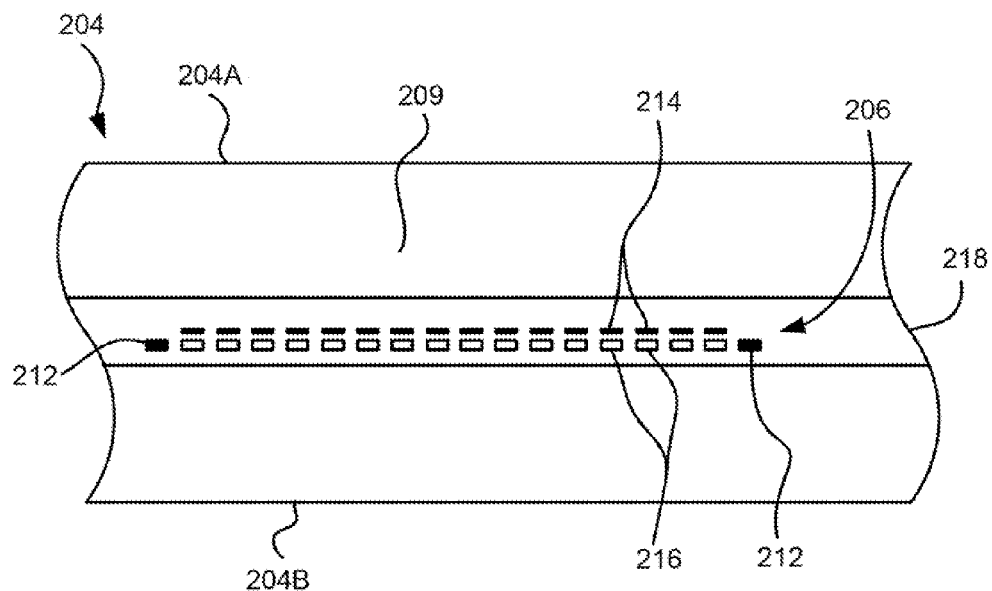
FIG. 2B is a detailed view taken from Circle 2B of FIG. 2A.

FIG. 2B depicts a plurality of readers and/or writers 206 formed in a gap 218 on the module 204 in Circle 2B of FIG. 2A. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape.

While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-2B together, each module 204 may include a complementary set of readers and/or writers 206 for such things as bi-directional reading and writing, read-while-write capability, backward compatibility, etc.

Figure 2C:
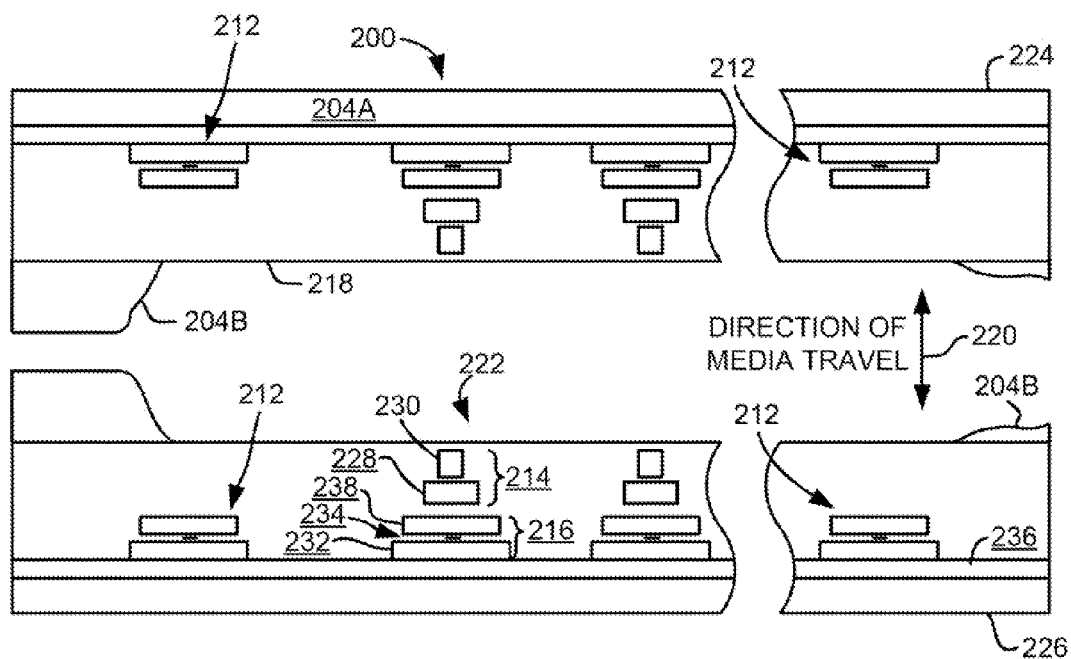
FIG. 2C is a detailed view of a partial tape bearing surface of a pair of modules.

FIG. 2C shows a partial tape bearing surface view of complimentary modules of a magnetic tape head 200 according to one embodiment. In this embodiment, each module has a plurality of read/write (R/W) pairs 222 in a piggyback configuration formed on a common substrate 204A and an optional electrically insulative layer 236. Although the writers (exemplified by the write transducer 214) and the readers (exemplified by the read transducer 216) are shown as being aligned parallel to an intended direction of travel of a tape medium thereacross, according to other embodiments, the write transducers 214 and the read transducers 216 of each of the R/W pairs 222 may be offset in the plane of deposition thereof, as will be discussed in detail below (e.g., see FIGS. 10A-10B).

It should be noted that the intended direction of tape travel is sometimes referred to herein as the direction of tape travel, and such terms may be used interchangeable. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Furthermore, the servo readers 212 may include a pair of transducers (not shown) which are offset in the plane of deposition thereof. According to various embodiments, the offset between the transducers of the servo readers 212 may be determined using any of the embodiments described in detail below. Moreover, although the transducer pairs are depicted as having common shields for each of the servo readers 212, according to other embodiments, each of the transducers may have their respective shields, e.g., as illustrated in FIG. 11B.

With continued reference to FIG. 2C, the magnetic tape medium generally moves in either a forward or reverse direction along the intended direction of tape travel, as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe(—), CZT or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type, including those based on MR, GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further embodiments, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
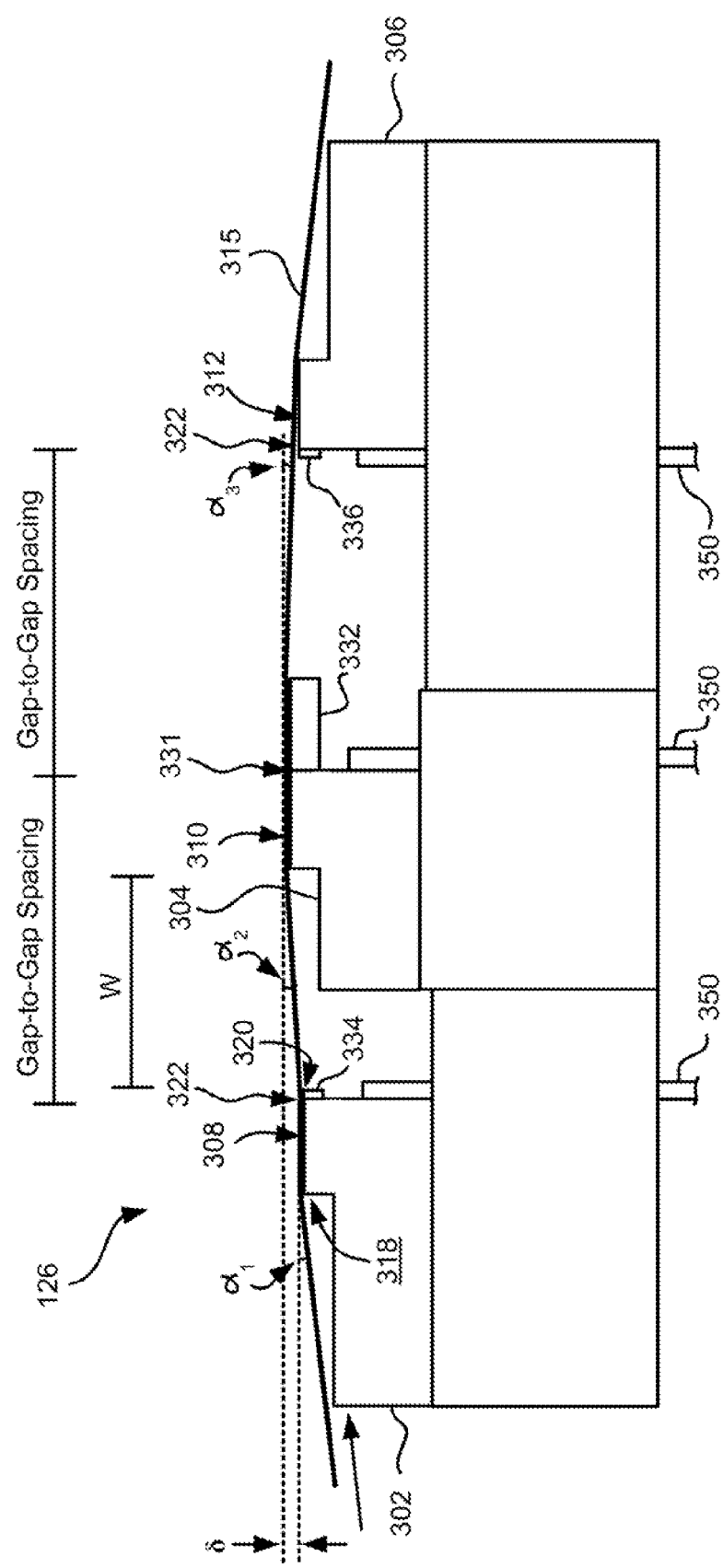
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
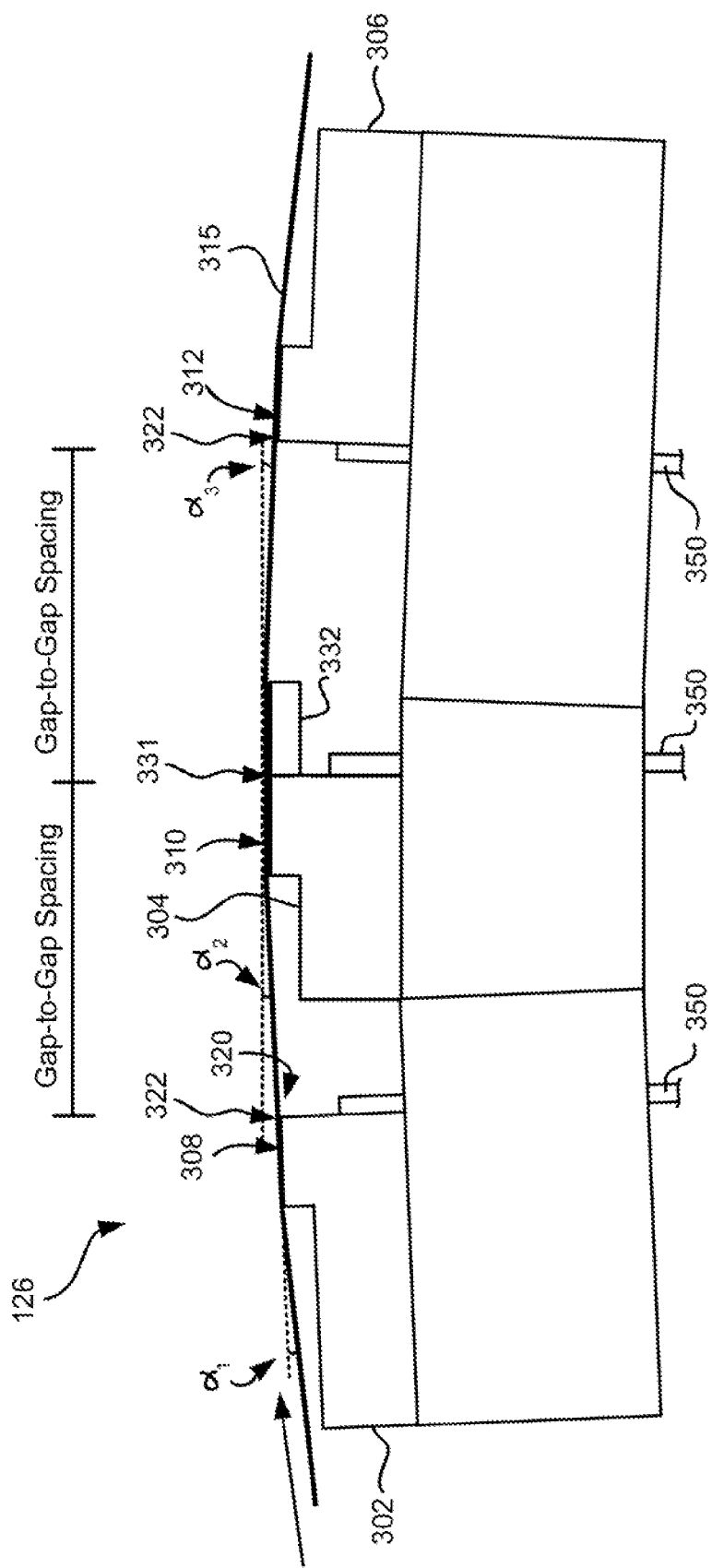
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used LTO tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
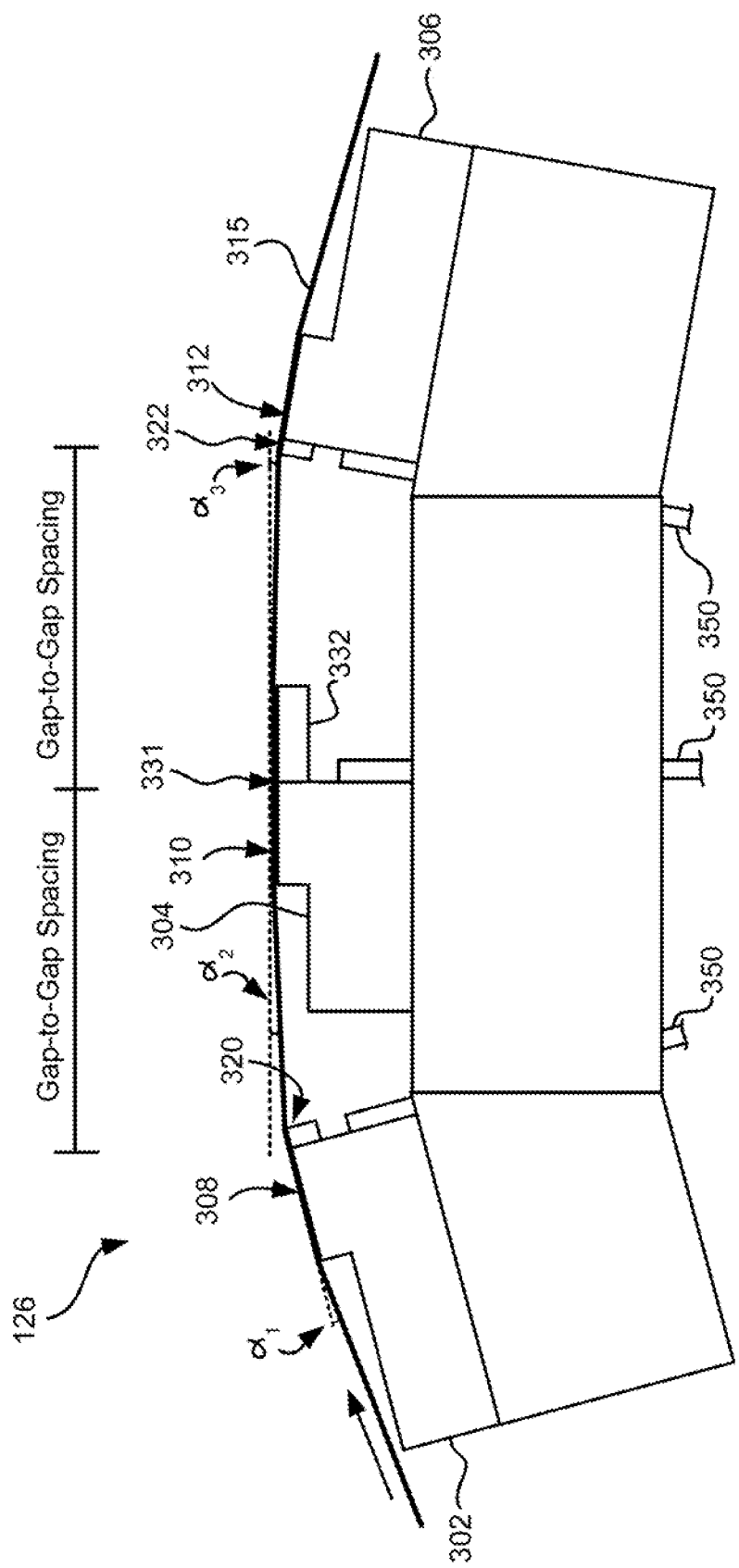
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other embodiments, the modules may be constructed as a unitary body. Those skilled in the art, armed with the present teachings, will appreciate that other known methods of manufacturing such heads may be adapted for use in constructing such heads.

As noted above, tape lateral expansion and contraction present many challenges to increasing data track density on conventional products. Conventional products have attempted to compensate for tape lateral expansion and contraction by controlling tape width by tension and improving the characteristics of the media itself. However, these methods fail to fully cancel the tape lateral expansion and contraction, and actually lead to other problems, including tape stretching and media cost increases, respectively.

Figure 8A:
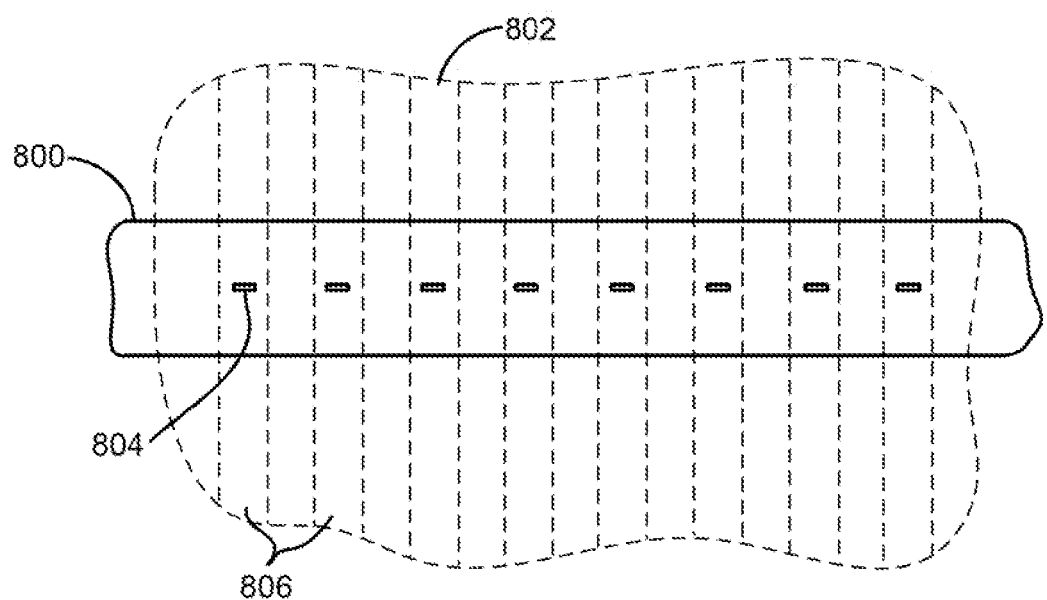
FIGS. 8A-8C are partial top-down views of one module of a magnetic tape head according to one embodiment.
Figure 8B:
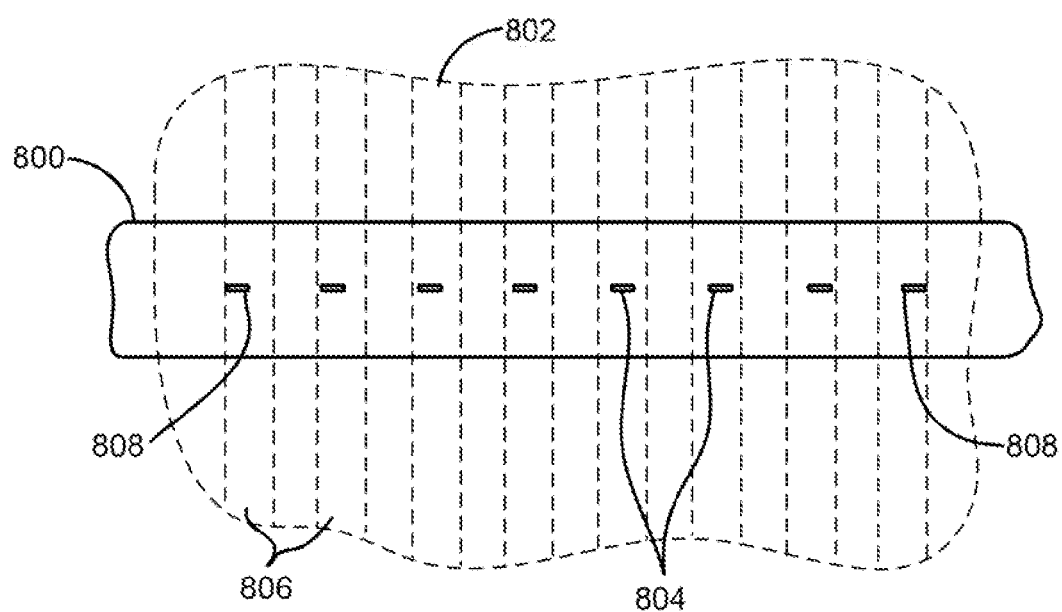
Figure 8C:
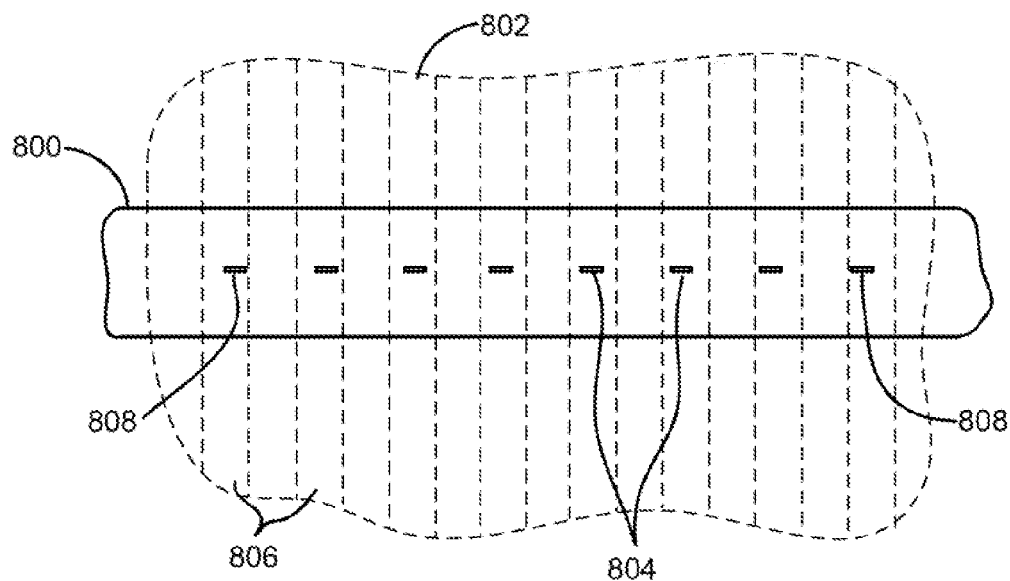

FIGS. 8A-8C are intended to depict the effect of tape lateral expansion and contraction on transducer arrays position relative thereto, and are in no way intended to limit the invention. FIG. 8A depicts a module 800 relative to the tape 802, where the tape has a nominal width. As shown, the transducers 804 are favorably aligned with the data tracks 806 on the tape 802. However, FIG. 8B illustrates the effect of tape lateral contraction. As shown, contraction of the tape causes the data tracks to contract as well, and the outermost transducers 808 are positioned along the outer edges of the outer data tracks as a result. Moreover, FIG. 8C depicts the effect of tape lateral expansion. Here expansion of the tape causes the data tracks to move farther apart, and the outermost transducers 808 are positioned along the inner edges of the outer data tracks as a result. If the tape lateral contraction is greater than that shown in FIG. 8B, or the tape lateral expansion is greater than that shown in FIG. 8C, the outermost transducers 808 will cross onto adjacent tracks, thereby causing the adjacent tracks to be overwritten during a writing operation and/or resulting in readback of the wrong track during a readback operation. Moreover, running effects, such as tape skew and lateral shifting may exacerbate such problems, particularly for tape having shingled data tracks.

Thus, it would be desirable to develop a tape drive apparatus able to read and/or write tracks onto the tape in the proper position, regardless of the extent of tape lateral expansion and/or contraction at any given time. Various embodiments described and/or suggested herein overcome the foregoing challenges of conventional products, by orienting at least two modules of a tape drive apparatus, such as by rotating, pivoting and/or tilting, thereby selectively altering the pitch of the transducers in their arrays, as will soon become apparent.

By selectively orienting a module, the pitch of the transducers on the module is thereby altered, preferably aligning the transducers with the tracks on a tape for a given tape lateral expansion and/or contraction. Tape contraction (shrinkage) can be dealt with by orienting a nominally non-offset head, but tape expansion (dilation) cannot. Thus, to accommodate both shrinkage and dilation about a "nominal," the head must be statically positioned at a nominal angle of at least approximately 0.1° as will be explained below. Thereafter, smaller angular adjustments (e.g., about 1° or lower, but could be more) may be made to the already-oriented module in order to compensate for any variation of the tape lateral expansion and/or contraction, thereby keeping the transducers aligned with tracks on the tape.

Figure 9B:
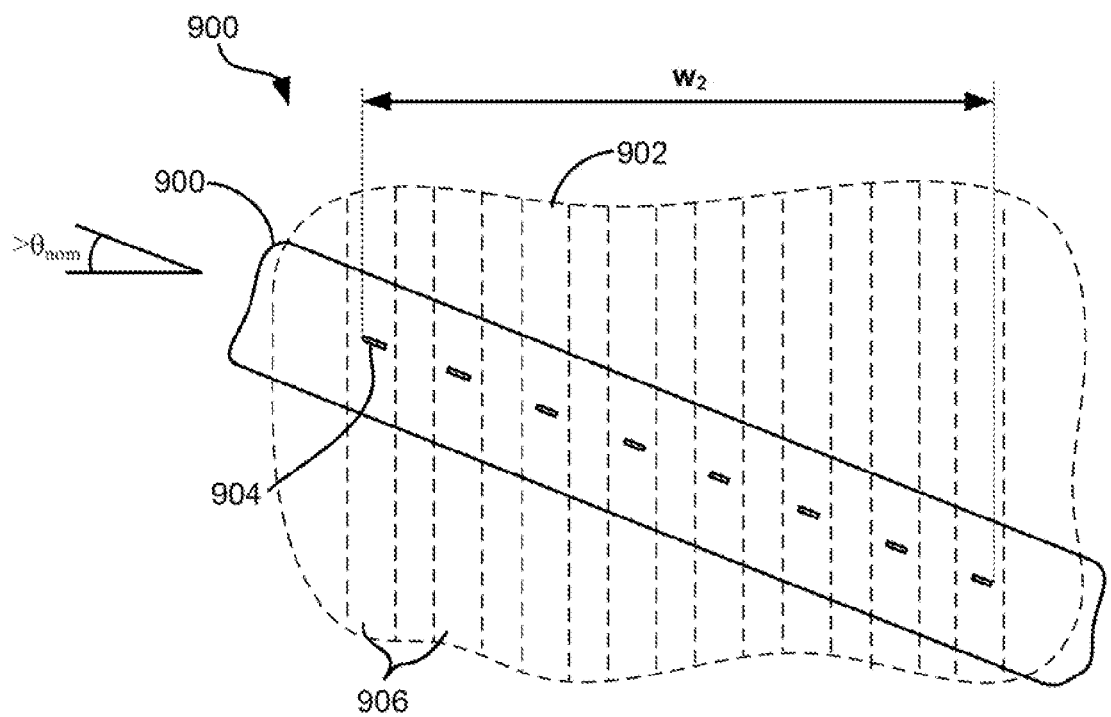
FIGS. 9A-9C are partial top-down views of one module of a magnetic tape head according to one embodiment.
Figure 9C:
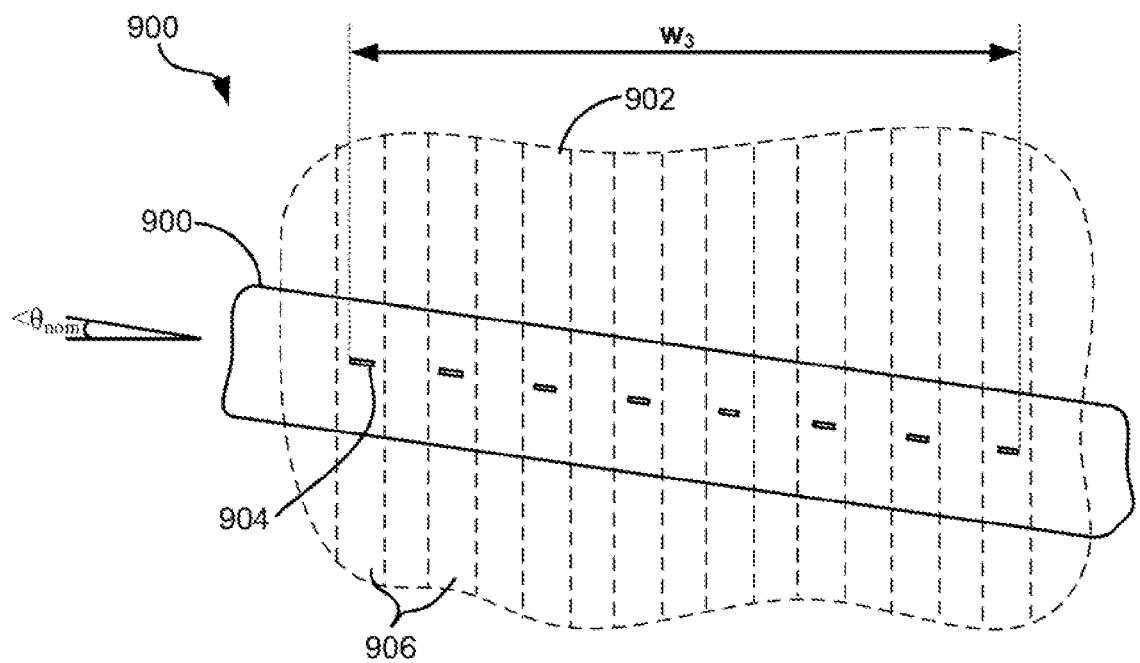
Figure 9A:
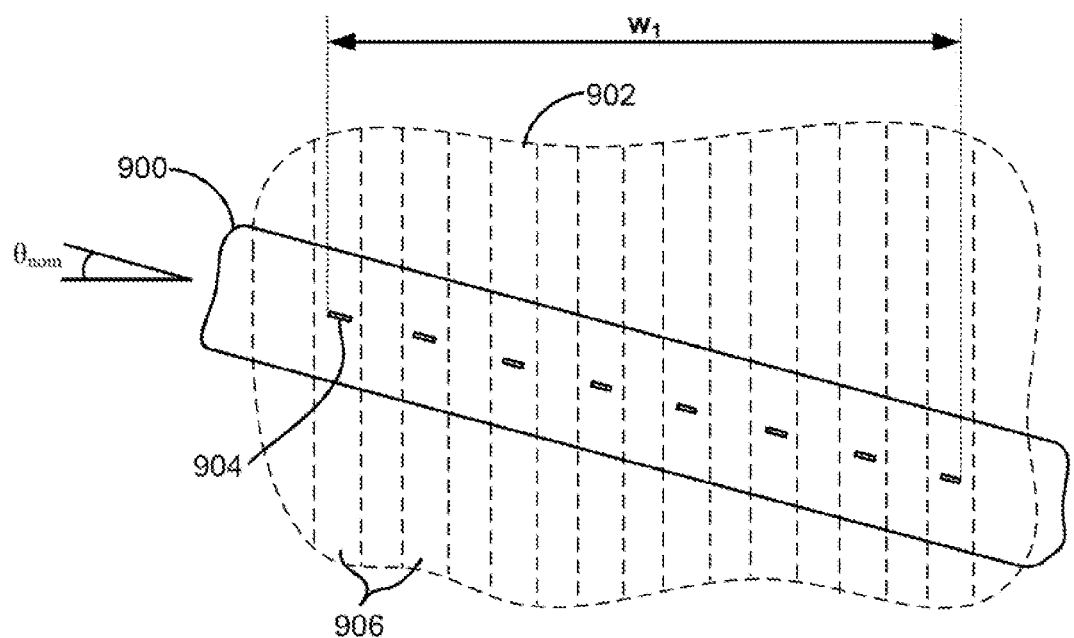

FIGS. 9A-9C illustrate representational views of the effects of orienting a module having transducer arrays. It should be noted that the angles of orientation illustrated in FIGS. 9A-9C are an exaggeration (e.g., larger than would typically be observed), and are in no way intended to limit the invention.

Referring to FIG. 9A, the module 900 is shown relative to the tape 902, where the tape has a nominal width. As illustrated, the module 900 is oriented at an angle $\theta_{nom}$ such that the transducers 904 are favorably aligned with the data tracks 906 on the tape 902. However, when the tape 902 experiences tape lateral contraction and/or expansion, the data tracks 906 on the tape contract and/or expand as well. As a result, the transducers on the module are no longer favorably aligned with the data tracks 906 on the tape 902.

In FIG. 9B, the tape 902 has experienced tape lateral contraction. Therefore, in a manner exemplified by FIG. 8B, the transducers 904 on the module 900 of FIG. 9B would no longer be favorably aligned with the data tracks 906 on the tape 902 if no adjustment were made. However, as alluded to above, smaller angular adjustments may be made to the already-oriented module 900 in order to compensate for tape lateral contraction. Therefore, referring again to FIG. 9B, the angle of orientation $>\theta_{nom}$ of the module 900 is further positioned at an angle greater than $\theta_{nom}$. By increasing the angle $>\theta_{nom}$ the effective width $w_2$ of the array of transducers decreases from the effective width $w_1$ illustrated in FIG. 9A. This also translates to a reduction in the effective pitch between the transducers, thereby realigning the transducers along the contracted data tracks 906 on the tape 902 as shown in FIG. 9B.

On the other hand, when the tape experiences tape lateral expansion, the data tracks on the tape expand as well. As a result, the transducers on the module would no longer be favorably aligned with the data tracks on the tape if no adjustments were made. With reference to FIG. 9C, the tape 902 has experienced tape lateral expansion. As a result, further angular adjustments may be made to the angle of orientation of the module in order to compensate for the tape lateral expansion. Therefore, referring again to FIG. 9C, the angle of orientation $<\theta_{nom}$ of the module 900 is reduced to an angle less than $\theta_{nom}$. By decreasing the angle of orientation $<\theta_{nom}$ the effective width $w_3$ of the array of transducers 904 increases from the effective width $w_1$ illustrated in FIG. 9A. Moreover, reducing the effective width of the array of transducers 904 also causes the effective pitch between the transducers to be reduced, thereby realigning the transducers along the data tracks 906 on the tape 902.

In a preferred embodiment, magnetic tape apparatuses have two or more modules, each having an array of transducers, typically in a row. Depending on the desired embodiment, the additional rows of transducers may allow the apparatus to read verify during the write process, but is not limited thereto. As mentioned above, the foregoing conventional challenges may be overcome, e.g., by rotating a given module about an axis orthogonal to the plane in which its array resides (e.g., parallel to the plane of the tape bearing surface), thereby selectively altering the pitch of the transducers in the array.

By providing an apparatus that compensates for tape lateral expansion and/or contraction, various embodiments enable use of wider readers, resulting in a better signal to noise ratio (SNR), and/or smaller data tracks, resulting in a higher capacity per unit area of the media.

Furthermore, a design having offset reader/writer transducer pairs may be incorporated with any of the embodiments described herein, thereby desirably allowing read while write capability. Additional embodiments described herein preferably allow for offset servo readers to be incorporated in conjunction with the offset reader/writer transducer pairs. As alluded to above, this enables use of a standard servo band, thereby allowing placement of more tracks on the tape.

Figure 10A:
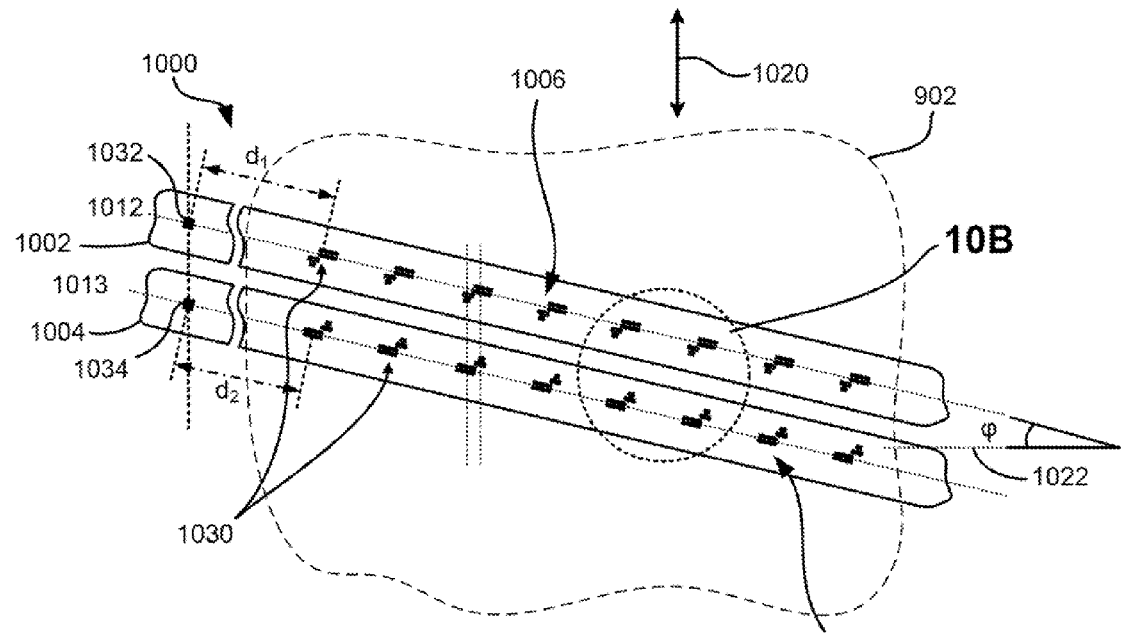
FIG. 10A is a partial top-down view of an apparatus with two modules according to one embodiment.
Figure 10B:
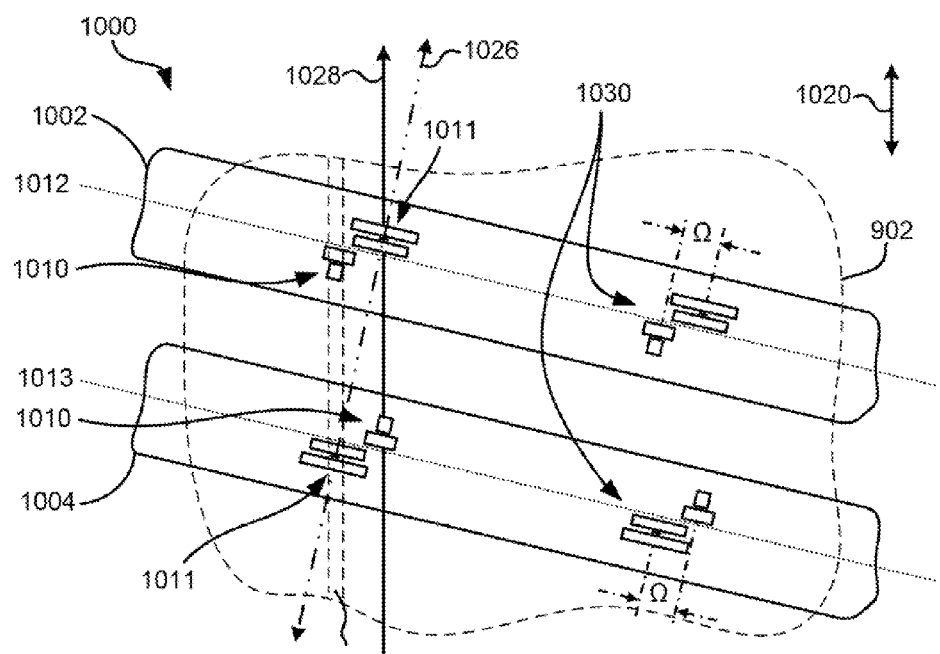
FIG. 10B is a detailed view of the embodiment shown in FIG. 10A, taken from inside circle 10B.

FIGS. 10A-10B depict an apparatus 1000 for compensating for tape lateral expansion and/or contraction, in accordance with one embodiment. As an option, the present apparatus 1000 may be implemented in conjunction with features from any other embodiment listed herein, such as those described with reference to the other FIGS. Of course, however, apparatus 1000 and others presented herein may be used in various applications and/or in permutations which may or may not be specifically described in the illustrative embodiments listed herein. Further, the apparatus 1000 presented herein may be used in any desired environment. Thus FIGS. 10A-10B (and the other FIGS.) should be deemed to include any and all possible permutations.

Referring to FIGS. 10A-10B, the apparatus 1000 includes modules 1002, 1004, each of which have an array 1006, 1008 of transducer pairs 1030. According to some embodiments, the apparatus 1000 may further incorporate a magnetic tape head, e.g., 200 of FIG. 2, the magnetic tape head having the modules 1002, 1004, but is not limited thereto. As mentioned above, although FIG. 2C illustrates the write transducers 214 and the read transducers 216 of each of the R/W pairs 222 as being aligned parallel to the intended direction 220 of tape travel, the offset transducer pairs 1030 of the present embodiment may alternatively be implemented in the magnetic tape head 200.

With continued reference to FIGS. 10A-10B, the transducer pairs 1030 of each of the modules 1002, 1004 include two transducers 1010, 1011. Furthermore, according to a preferred embodiment, one of the transducers in each of the pairs may be a reader, while the other of the transducers in each of the pairs may be a writer. Thus, the pairs 1010, 1011 of transducers in each array may be reader/writer pairs.

In another embodiment, the modules 1002, 1004, may be fixed relative to each other, e.g., to ensure a designed spacing therebetween during use of the apparatus 1000. In view of the present description, "fixed" is intended to mean constrained from a directional movement relative to each other such that the arrays of each maintain a fixed position relative to each other. In other words, the modules may be fixed such that the axes 1012, 1013 of the arrays 1006, 1008 are oriented about parallel to each other, respectively.

It should be noted that the axes 1012, 1013 of each array 1006, 1008 of transducer pairs 1030 are defined by the dashed lines that lie between opposite ends thereof, e.g., positioned farthest apart. According to a preferred embodiment, the axis 1012, 1013 of each of the at least one array 1006, 1008 of transducers may be oriented about parallel to each other, at a nominal angle $\phi$ relative to a line oriented perpendicular to the intended direction 1020 of tape travel thereacross, as will be described in further detail below.

In various embodiments, the modules may be fixed relative to each other by using rods, fasteners, adhesives, cables, wire, etc. Moreover, according to different embodiments, the modules are preferably fixed relative to each other prior to being installed in the apparatus 1000, head, etc. depending on the desired embodiment. However, the modules are preferably selectively orientable (e.g., tiltable and/or rotatable) as a single structure about a pivot point while remaining fixed relative to each other, as will soon become apparent.

With continued reference to FIGS. 10A-10B, the transducers 1010, 1011 within each of the transducer pairs 1030 are illustrated as being offset from one another in a direction parallel to the axes 1012, 1013 of the arrays 1006, 1008. According to the illustrative embodiment depicted, a first transducer 1010 of each of the transducer pairs 1030 of a first of the modules 1002 is offset $\Omega$ from a second transducer 1011 of each of the transducer pairs 1030 of the first module 1002 in a first direction parallel to the axes 1012, 1013 of the arrays 1006, 1008. Furthermore, a first transducer 1010 of each of the transducer pairs 1030 the second module 1004 is offset $\Omega$ from a second transducer 1011 of each of the transducer pairs 1030 of the second module 1004 in a second direction that is opposite (i.e., about antiparallel) the first direction.

According to various embodiments, the offset $\Omega$ between the transducers 1010, 1011 in each of the transducer pairs 1030 for each of the arrays 1006, 1008 may be at least approximately 3 μm (micrometers), but could be higher or lower depending on the desired embodiment. According to preferred embodiments, the offset $\Omega$ between transducers of each of the transducer pairs 1030 of the first and second modules 1002, 1004 may be adjusted, e.g., such that transducers of opposing pairs are about aligned when the modules are oriented at about the nominal angle $\phi$, as will soon become apparent.

According to various embodiments, the nominal angle $\phi$ at which the axes 1012, 1013 of the arrays 1006, 1008 are oriented may depend, at least in part, on the offset $\Omega$ between transducers of each of the transducer pairs. According to preferred embodiments, the offset $\Omega$ between transducers of each of the transducer pairs 1030 of the first and second modules 1002, 1004 may be adjusted such that the first transducers 1010 of the transducer pairs on the second module 1004 are about aligned with the second transducers 1011 of the transducer pairs of the first module 1002 in the intended direction 1020 of tape travel, when the axes 1012, 1013 of the arrays 1006, 1008 are oriented at about the nominal angle $\phi$, as illustrated in FIG. 10B. Furthermore, the first transducers 1010 of the transducer pairs of the first module 1002 are also preferably about aligned with the second transducers 1011 of the transducer pairs of the second module 1004 along imaginary line 1026 which is oriented substantially parallel to the intended direction 1020 of tape travel, when the axes 1012, 1013 of the arrays 1006, 1008 are oriented at about the nominal angle $\phi$, thereby enabling bidirectional read while write capability for the apparatus 1000.

Figure 10C:
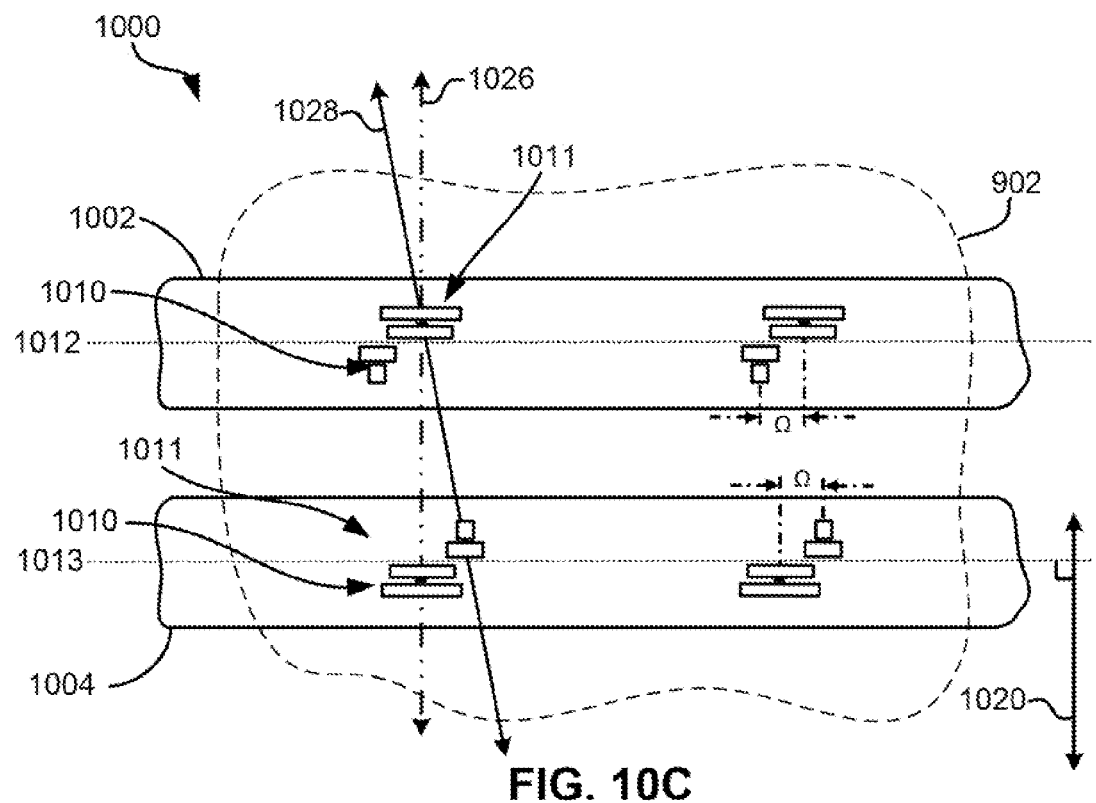
FIG. 10C is a detailed view of the embodiment shown in FIG. 10A, taken from inside circle 10B.

Moreover, looking to FIG. 10C, the transducer pairs 1030 of the modules 1002, 1004 may also be oriented such that the second transducers 1011 of the transducer pairs on the second module 1004 are about aligned with the second transducers 1011 of the transducer pairs of the first module 1002 along imaginary line 1028 which is oriented substantially parallel to the intended direction 1020 of tape travel, when the axes 1012, 1013 of the arrays 1006, 1008 are oriented orthogonal to the intended direction 1020, e.g., prior to being tilted to the desired nominal angle $\phi$. Such a design also allows fabrication using a single module design, where the opposing modules are identical in construction.

Thus, a desired nominal angle $\phi$ value may be calculated and/or determined using the offset $\Omega$ (spacing) between the transducers 1010, 1011 of the transducer pairs 1030, or vice versa. Furthermore, nominal angle $\phi$ values according to various offsets may be precalculated and stored in lookup tables, computer code, memory, etc., for future use.

In different embodiments, the nominal angle $\phi$ may be between about 0.05° and about 45°, more preferably between about 0.1° and about 10°, relative to a line 1022 oriented perpendicular to the direction 1020 of tape travel, but may be higher or lower depending on the desired embodiment. Furthermore, the inventors have surprisingly and unexpectedly found that by incorporating a nominal angle $\phi$ in the range between greater than about 0.1° and about 10° with various embodiments described herein, reading from and writing to the tape may be conducted without notably steering the tape and/or causing media damage over the life of the tape. For example, the inventors expected that wrapping the tape over angled skiving edges would steer the tape laterally.

Angles of orientation greater than within the specified range (e.g., greater than about 10°) are undesirable as higher angles tend to cause steering of the tape when used. However, as described above, the angles of orientation within the specified range unexpectedly and unforeseeably did not result in adverse steering of the tape. Moreover, it is more difficult to distinguish between tape lateral expansion and/or contraction and skew when angles of orientation of the modules are greater than within the specified range. This may cause difficulties when matching the dimensional conditions of the tape and/or orientation of the modules of the current operation to that of the previous operation (explained in further detail below). It should also be noted that the angle of orientation φ illustrated in FIG. 10A is exaggerated (e.g., larger than within the desired range), and is in no way intended to limit the invention.

Moreover, in FIG. 10A, each array 1006, 1008 is illustrated as including a servo transducer 1032, 1034 respectively. According to a preferred embodiment, the center to center distance $d_1$, $d_2$ between each of the servo transducers 1032, 1034 and a data transducer 1010 of the nearest transducer pair 1030 is preferably the same. However, in other embodiments, the servo transducers 1032, 1034 may be spaced differently from the nearest data transducer, e.g., resulting in different values for the respective distances $d_1$, $d_2$.

Figure 12:
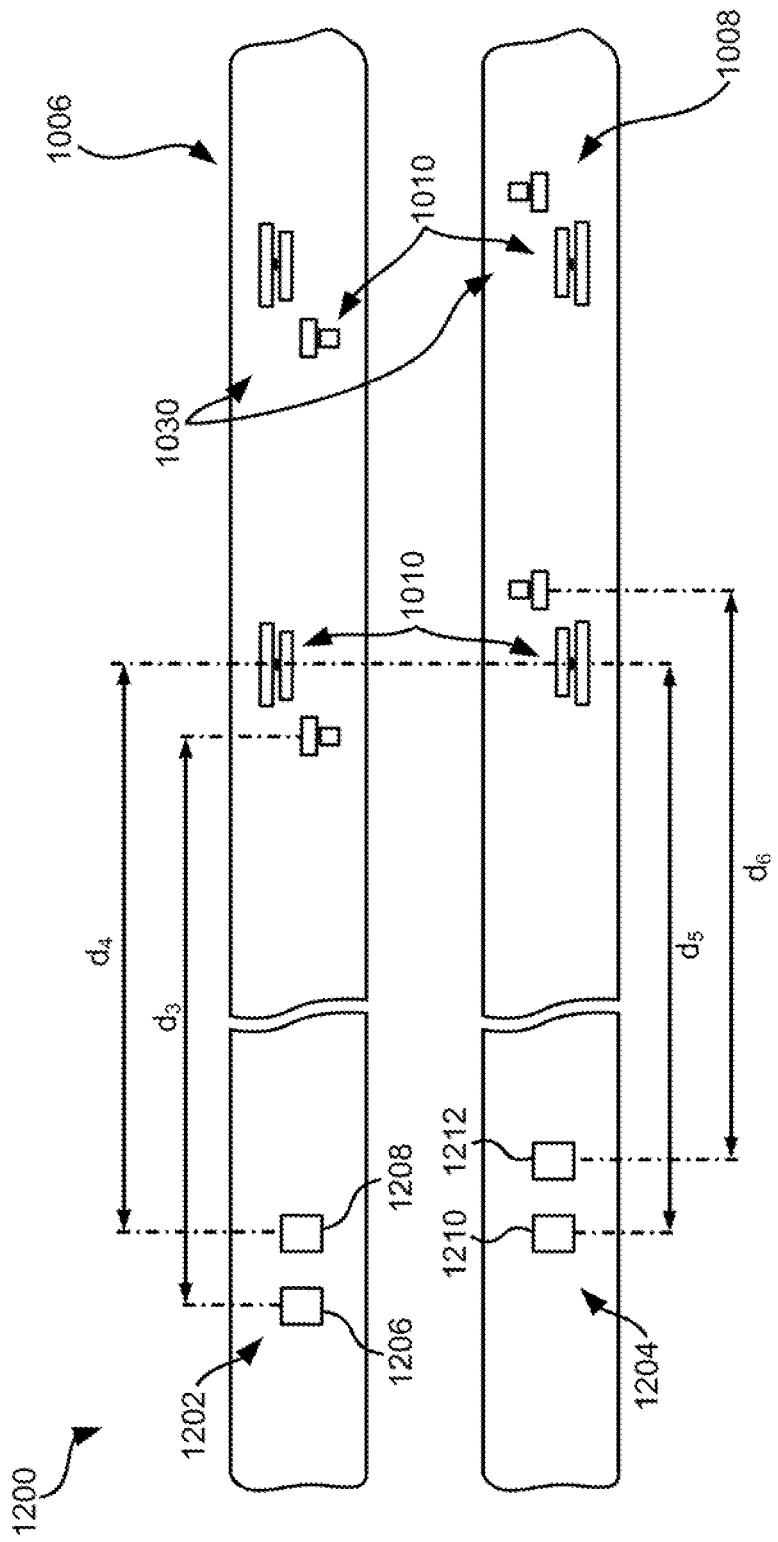
FIG. 12 is a partial top-down view of a system with pairs of servo transducers according to one embodiment.

According to other embodiments, each array 1006, 1008 may include at least one pair of servo transducers, where a given pair may be positioned on one side of the array of transducers. Looking to the exemplary embodiment of a system 1200 depicted in FIG. 12, two arrays 1006, 1008 of transducer pairs 1030 include pairs 1202, 1204 of servo transducers 1206 and 1208, 1210 and 1212 respectively. According to a preferred embodiment, each of the servo transducers are spaced substantially the same from a respective one of the transducers 1010 of the transducer pairs 1030 illustrated. In other words, the distance $d_3$ between one of the servo transducers 1206 and a closer one of the transducers 1010 of a transducer pair 1030 is substantially the same as the distance $d_4$ between another one of the servo transducers 1208 and a closer one of the transducers 1010 of a transducer pair 1030. Additionally, the distance $d_5$ between one of the servo transducers 1210 and a closer one of the transducers 1010 of a transducer pair 1030 is substantially the same as the distance $d_6$ between another one of the servo transducer 1212 and a closer one of the transducers 1010 of a transducer pair 1030. In an exemplary embodiment, the distance $d_3$ is equal to the distance $d_5$, while the distance $d_4$ is equal to the distance $d_6$.

Moreover, the servo transducers 1206 and 1208, 1210 and 1212 of each of the pairs 1202, 1204 respectively, may have a spacing (offset) therebetween that is equal to the offset between the transducers in each transducer pair in the array 1006, 1008. Thus, the spacing between the each of the pairs of servo transducers may be at least approximately 4 micrometers, but could be higher or lower, depending on the desired embodiment. However, in other embodiments, the spacing between the each of the pairs of servo transducers may be different than the spacing between the transducers 1010, 1011 of the transducer pairs 1030.

Depending on the embodiment, the servo transducers in each of the pair of servo transducers may be coplanar, e.g., each of the servo transducers in a pair may be formed in the same deposition process of forming the servo transducers. Moreover, in a further embodiment, the servo transducers in each of the pairs of servo transducers may be substantially aligned with the first transducers 1010 of the associated array, along the respective axes 1012, 1013 thereof. In other words, the servo readers are preferably in the same plane of deposition as the data readers, and have a spacing within the pair of servo transducers equal to the offset between the first and second transducers 1010, 1011 (e.g., the readers and writers) of the transducer pairs within the same array.

Depending on the embodiment, the servo readers may optionally be comprised of a common central hard bias magnet and may optionally have common magnetic shields (e.g., see FIG. 11A), but are not limited thereto. Thus, in one embodiment, the servo transducers may share a common longitudinal bias material, e.g., of a type known in the art. However, in other embodiments, the servo readers may be formed using separate hard bias magnets and/or magnetic shields, as will be described in detail below (e.g., see FIG. 11B).

It follows that in some embodiments, the each of the modules 1002, 1004 may have about identical construction. In other words, the modules 1002, 1004 may have identical construction and design, except for processing variations resulting during fabrication. One skilled in the art, upon being apprised of the present specification, will appreciate how to adapt known processes to perform the various steps listed herein.

The modules may originate from the same wafer. An advantage of such co-fabrication is that the offsets between the reader/writer pairs are the same for the two modules, thus producing more accurate track placement on tape. Referring to FIG. 10B, the offset Ω will be the same on each module when the modules originate from the same wafer.

Moreover, a key advantage of having about identical construction is that the offset between transducers within each of the transducer pairs is built into the wafer with a much higher degree of precision than is possible with any conventional methods. Additionally, this enables achieving high areal density while keeping the manufacturing cost associated with the various embodiments herein far less than those of conventional products as the reader/writer pairs for either of the arrays of a given embodiment are formed from the same wafer.

During assembly of the apparatus, according to one embodiment, because the offset is built in at the wafer level, the modules are preferably aligned without offset between readers on the opposing modules, for example. See, e.g., the aligned readers in FIG. 12.

Figure 10D:
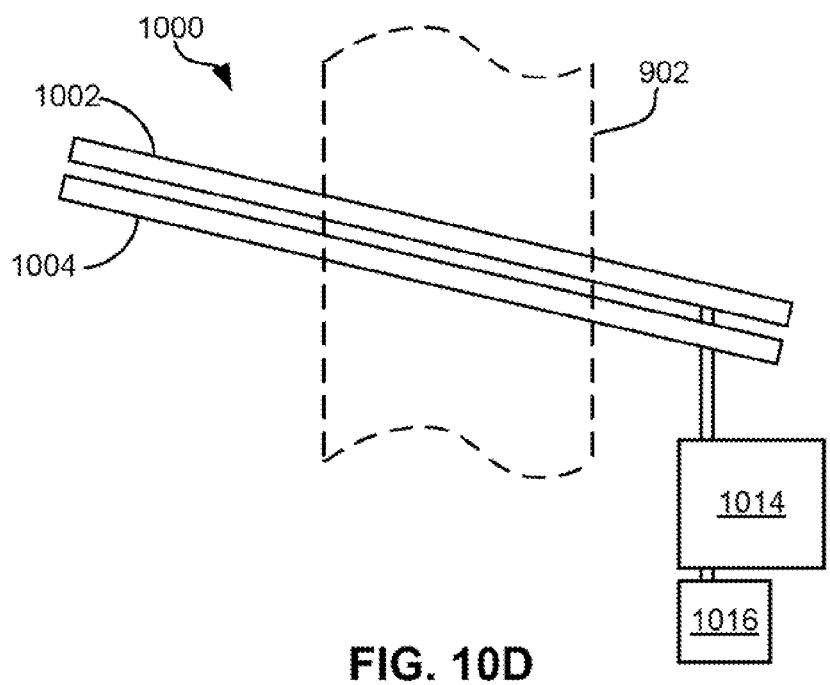
FIG. 10D is a diagram of the system having the apparatus of FIG. 10A.

Referring now to FIG. 10D, the apparatus 1000 includes a mechanism 1014, such as a tape dimensional instability compensation mechanism, for orienting the modules to control a transducer pitch presented to a tape. The tape dimensional instability compensation mechanism 1014 preferably allows for the orienting of the modules to be done while the modules are reading and/or writing. The tape dimensional instability compensation mechanism 1014 may be any known mechanism suitable for orienting the modules. Illustrative tape dimensional instability compensation mechanisms 1014 include worm screws, voice coil actuators, thermal actuators, piezoelectric actuators, etc.

A controller 1016 in one embodiment is configured to control the tape dimensional instability compensation mechanism 1014 based on a readback signal of the tape, e.g., servo signals, data signals, a combination of both, etc. Thus, in one embodiment, the controller 1016 may be configured to control the mechanism 1014 for orienting the modules based on a skew of the tape. In another embodiment, the dimensional conditions of the tape and/or orientation of the modules when the tape was written may be retrieved e.g., from a database, cartridge memory, etc., and the orientation may be set based thereon to about match the transducer pitch of the current operation to that of the previous operation.

In various embodiments, additional logic, computer code, commands, etc., or combinations thereof, may be used to control the tape dimensional instability compensation mechanism 1014 for adjusting the orientation of the modules based on a skew of the tape. Moreover, any of the embodiments described and/or suggested herein may be combined with various functional methods, depending on the desired embodiment.

Figure 10E:
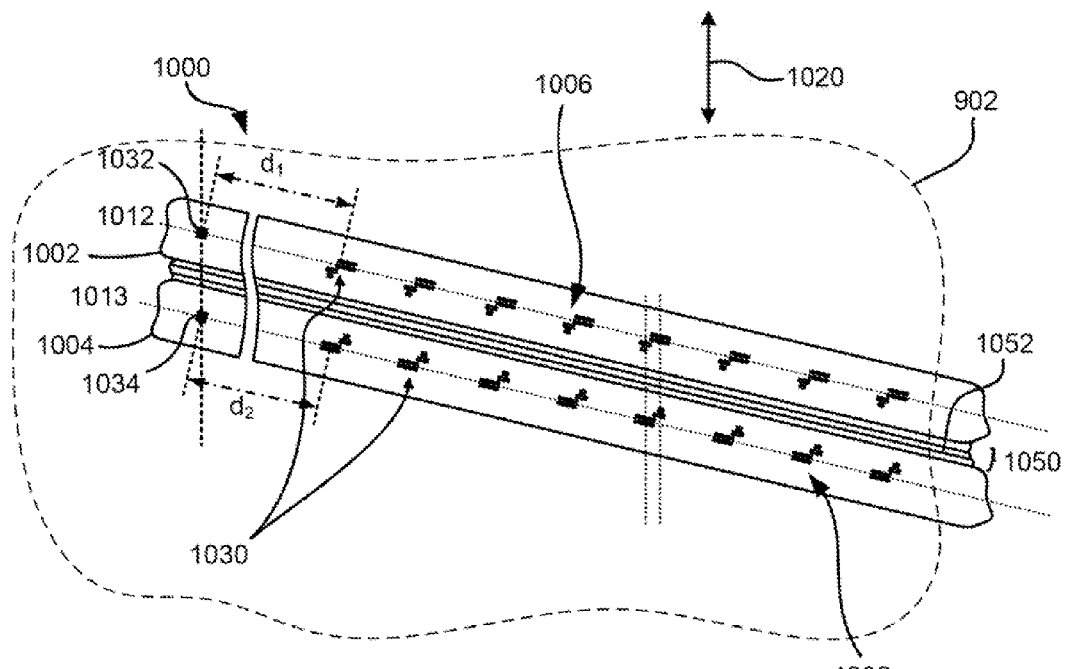
FIG. 10E is a partial top-down view of an apparatus with two modules according to one embodiment.

FIG. 10E depicts a variation of an apparatus as shown in FIG. 10A, and like elements are numbered the same in both FIGS. Referring again to FIG. 10E, it should be noted that the transducer pairs 1030 may include any of the designs described above with reference to the transducer pairs 1010, 1011 of FIGS. 10A-10B.

According to the depicted embodiment, the apparatus 1000 includes a spacer member 1050 that extends between tape bearing surfaces of the modules. The spacer member 1050 may be recessed from a plane of the tape bearing surfaces, but is preferably coplanar therewith and/or otherwise forms a portion of the overall tape bearing surface of the head.

In one embodiment, the spacer member 1050 includes a magnetic shield 1052 for magnetically shielding the first array 1006 of transducer pairs 1030 from the second array 1008 of transducer pairs 1030. Such magnetic shield 1052 may be formed of any suitable material known in the art, such as NiFe, CoFe, etc.

According to one embodiment, the magnetic shield 1052 may extend from the tape bearing surface, or some point therebelow, in a height direction (into the tape bearing surface), preferably for a distance that provides the desired shielding effect. For example, the shield 1052 may have a height similar to that of shields of the transducers. Thus, the dimensions of the shield 1052 may be altered (e.g., tuned) depending on the embodiment to achieve the desired effects for the overall functionality of the apparatus 1000.

Figure 10F:
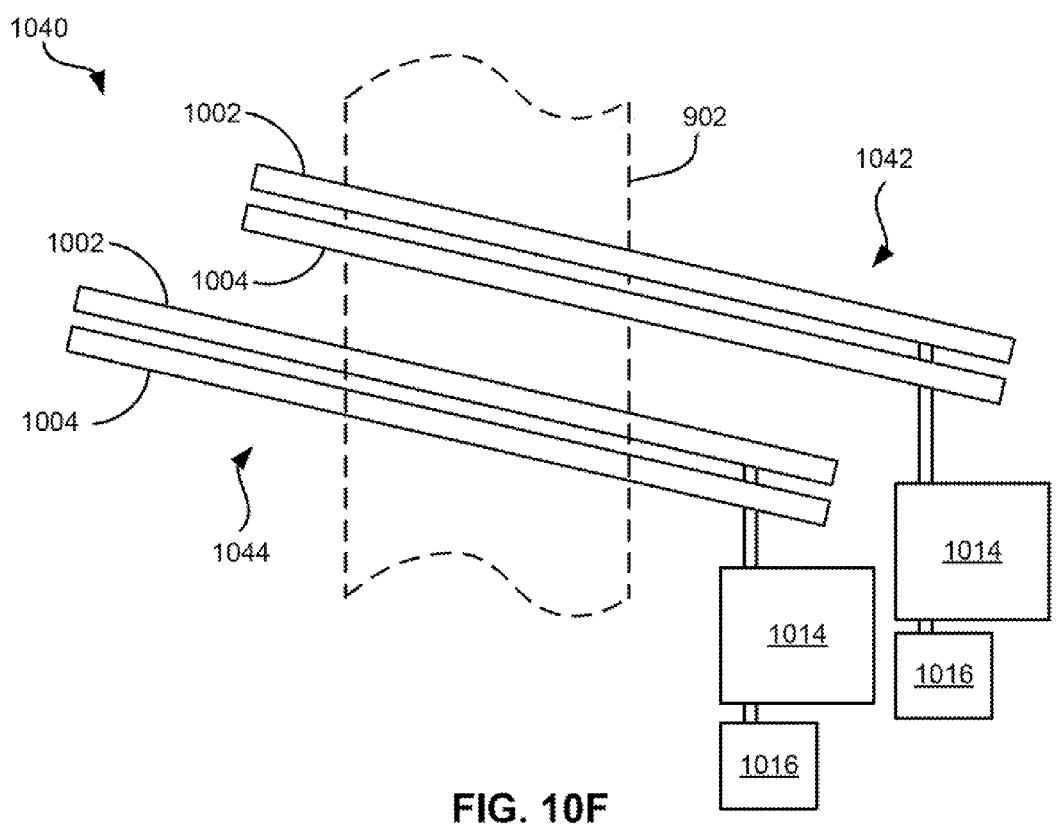
FIG. 10F is a partial top-down view of a system with multiple sets of modules according to one embodiment.

FIG. 10F depicts an alternate embodiment of an apparatus 1040, similar to that of FIG. 10D, but having two sets 1042, 1044 of modules. Although each set 1042, 1044 is illustrated as having two modules 1002, 1004, according to other embodiments, each set 1042, 1044 may include at least two modules, e.g., one or both of the sets may include more than two modules. Moreover, each set 1042, 1044 of modules is preferably independently orientable, e.g., to set the angle of orientation. According to a further embodiment, each set of modules may also be independently positionable for track following.

As illustrated, the sets 1042, 1044 of modules are coupled to a controller 1016 as well as a mechanism 1014. According to preferred embodiments, the controller 1016 and/or the mechanism 1014 may be used to position the two sets of modules, e.g., either uniformly, or individually, depending on the desired embodiment. Moreover, the controller 1016 and/or the mechanism 1014 may include any of the embodiments described above with reference to FIG. 10C.

Referring still to FIG. 10F, according to one embodiment, the outer modules of each set 1042, 1044 of modules may be configured for writing, while the inner modules of each set 1042, 1044 may be configured for reading. Thus, in one illustrative use case, the writers on the outer module of one set of modules may write while the readers of an inner module of the second set of modules may read back the just-written track. In another illustrative use case, the writers on the outer module of one set of modules may write while the readers of an inner module of the same set of modules may read back the just-written track.

Figure 11A:
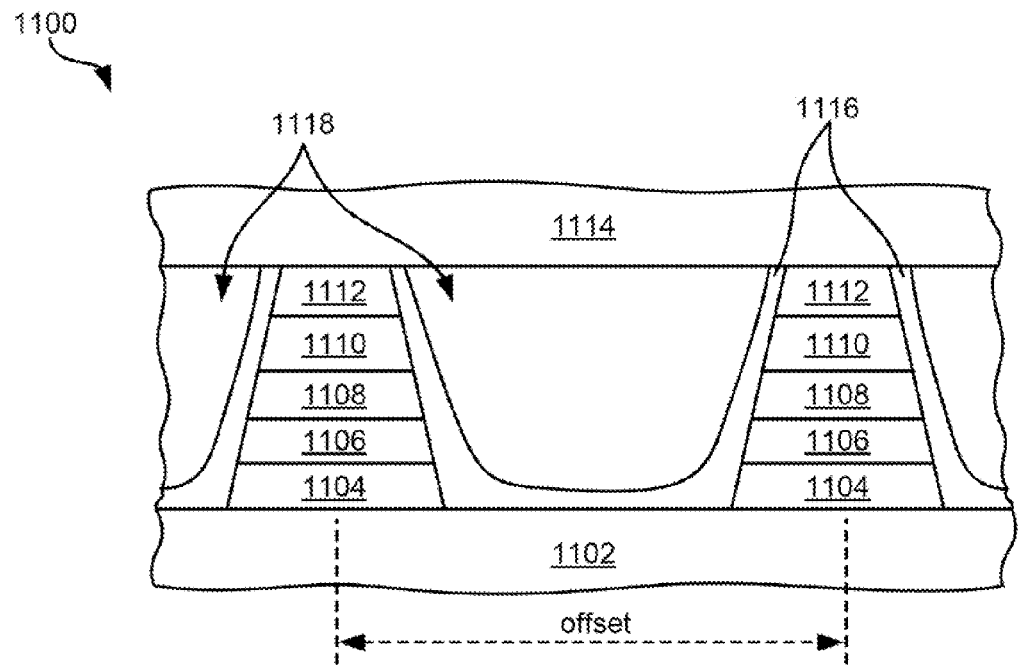
FIG. 11A is a partial side view of a servo reader transducer pair according to one embodiment.
Figure 11B:
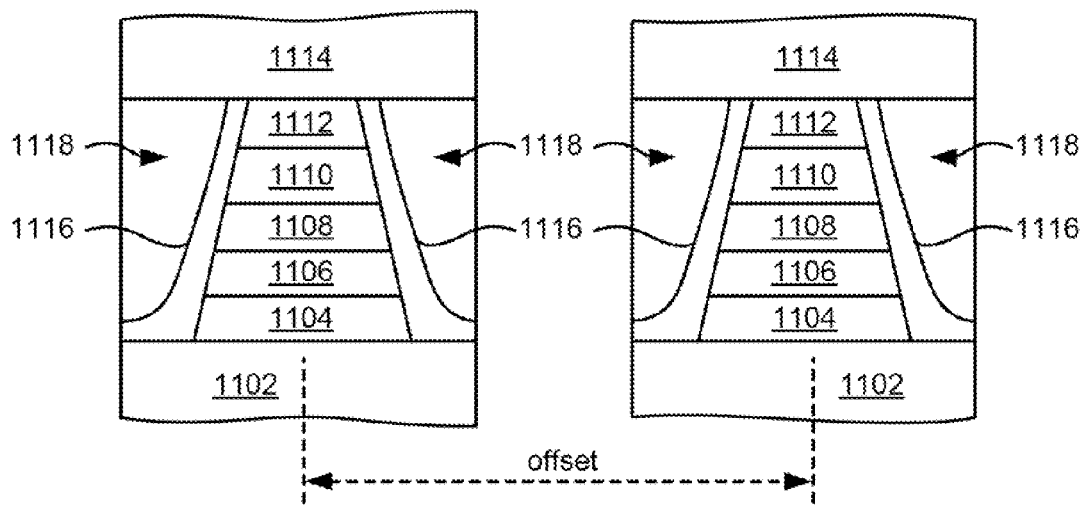
FIG. 11B is a partial side view of a servo reader transducer pair according to one embodiment.

Referring now to FIGS. 11A-11B, a servo reader 1100, having a transducer pair, is depicted in accordance with one embodiment. As an option, the present servo reader 1100 may be implemented in conjunction with features from any other embodiment listed herein, such as those described with reference to the other FIGS. Of course, however, servo reader 1100 and others presented herein may be used in various applications and/or in permutations which may or may not be specifically described in the illustrative embodiments listed herein. Further, the servo reader 1100 presented herein may be used in any desired environment. Thus FIGS. 11A-11B (and the other FIGS.) should be deemed to include any and all possible permutations.

Looking to FIGS. 11A-11B, the servo reader 1100 includes a bottom shield 1102 above which two sensor stacks are illustrated according to two different designs as will soon become apparent. However, with continued reference to both FIGS. 11A-11B, each of the sensor stacks have an antiferromagnetic (AFM) layer 1104, reference layer 1106, spacer layer 1108, free layer 1110, cap layer 1112 and top shield 1114, as would be appreciated by one skilled in the art upon reading the present description. The servo reader 1100 additionally includes an insulation layer 1116 and a bias layer 1118, e.g., which may include any conventional bias material of a type known in the art.

Referring now to FIG. 11A, the servo reader 1100 is shown as having a common central bias layer 1118 as well as common magnetic bottom and top shield layers 1102, 1114 for the transducer pair. Yet, looking to FIG. 11B, the servo reader 1100 is depicted as including separate shield layers 1102, 1114 and insulating layers 1116 for each of the transducer sensor stacks, according to a different embodiment. Thus, depending on the embodiment, a servo reader having a transducer pair may incorporate common or unique (e.g., individual) central bias layers, magnetic bottom shields and/or magnetic top shields.

It should also be noted that depending on the desired embodiment, the offset offset shown in FIGS. 11A-11B may include a value according to any of the embodiments described above. However, according to a preferred embodiment, the offset offset between the sensor stacks is preferably about the same as the offset between the transducers of the reader/writer pairs, e.g., see $\Omega$ of FIG. 10B. Furthermore, any of the layers depicted in FIGS. 11A-11B may include conventional layers of a type known as would be appreciated by one skilled in the art upon reading the present description.

It will be clear that the various features of the foregoing systems, apparatuses, and/or methodologies may be combined in any way, creating a plurality of combinations from the descriptions presented above.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," "apparatus," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (e.g., CD-ROM), a Blu-ray disc read-only memory (BD-ROM), an optical storage device, a magnetic storage device, or any suitable combination of the foregoing. In the context of this document, a non-transitory computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fibre, etc.

Program code embodied on a computer readable medium may be transmitted using any appropriate medium, including but not limited to wireless, wireline, optical fibre cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer, for example through the Internet using an Internet Service Provider (ISP).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart(s) and/or block diagram block or blocks.

It will be further appreciated that embodiments of the present invention may be provided in the form of a service deployed on behalf of a customer.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. An apparatus, comprising:
    at least two modules, each of the modules having: an array of transducers, the transducers in each array being arranged in pairs, wherein an axis of the array of transducers is defined between opposite ends thereof, wherein the axis of the array of transducers is oriented at a nominal angle relative to a line oriented perpendicular to an intended direction of tape travel thereacross, the nominal angle being between 0.1° and about 10°,
    wherein the axes of the arrays of the at least two modules are oriented about parallel to each other,
    wherein a first transducer of each of the transducer pairs of a first of the modules is offset from a second of the transducers of each of the transducer pairs of the first module in a first direction parallel to the axes of the arrays,
    wherein a first transducer of each of the transducer pairs of a second of the modules is offset from a second of the transducers of each of the transducer pairs of the second module in a second direction that is opposite the first direction,
    wherein the first transducers of the transducer pairs of the second module are about aligned with the second transducers of the transducer pairs of the first module in the intended direction of tape travel, and the first transducers of the transducer pairs of the first module are about aligned with the second transducers of the transducer pairs of the second module in the intended direction of tape travel, when the arrays are oriented at the nominal angle.

2. An apparatus as recited in claim 1, wherein the first transducers of the arrays are writers, wherein the second transducers of the arrays are readers.

3. An apparatus as recited in claim 1, wherein each array further includes at least one pair of servo transducers having a spacing therebetween that is equal to the offset between the transducers in each transducer pair in the array.

4. An apparatus as recited in claim 3, wherein the servo transducers in the at least one pair of servo transducers are coplanar.

5. An apparatus as recited in claim 4, wherein the servo transducers in the at least one pair of servo transducers are substantially aligned with the first transducers of the associated array along the axes of the arrays.

6. An apparatus as recited in claim 3, wherein the at least one pair of servo transducers share a common longitudinal bias material.

7. An apparatus as recited in claim 3, wherein the at least one pair of servo transducers share a common shield.

8. An apparatus as recited in claim 1, further comprising a mechanism for orienting the modules to control a transducer pitch presented to a tape.

9. An apparatus as recited in claim 8, further comprising a controller configured to control the mechanism for orienting the modules based on a skew of the tape.

10. An apparatus as recited in claim 1, wherein the offset between the transducers in each transducer pair in the array is at least 3 µm.

11. An apparatus as recited in claim 1, wherein the modules have about identical construction.

12. An apparatus as recited in claim 1, further comprising:
a drive mechanism for passing a magnetic medium over the modules; and
a controller electrically coupled to the modules.

13. An apparatus, comprising:
a magnetic tape head having at least two modules, each of the modules having an array of transducers, the transducers in each array being arranged in pairs;
a drive mechanism for passing a magnetic medium over the modules; and
a controller electrically coupled to the modules,
wherein an axis of each array of transducers is defined between opposite ends thereof,
wherein the axis of each array of transducers is oriented at a nominal angle relative to a line oriented perpendicular to an intended direction of tape travel thereacross, the nominal angle being between 0.1° and about 10°,
wherein the axes of the arrays are oriented about parallel to each other,
wherein a first transducer of each of the transducer pairs of a first of the modules is offset from a second of the transducers of each of the transducer pairs of the first module in a first direction parallel to the axes of the arrays,
wherein a first transducer of each of the transducer pairs of a second of the modules is offset from a second of the transducers of each of the transducer pairs of the second module in a second direction that is opposite the first direction,
wherein the first transducers of the transducer pairs of the second module are about aligned with the second transducers of the transducer pairs of the first module in the intended direction of tape travel, and the first transducers of the transducer pairs of the first module are about aligned with the second transducers of the transducer pairs of the second module in the intended direction of tape travel, when the arrays are oriented at the nominal angle.

14. An apparatus as recited in claim 13, wherein each array further includes at least one pair of servo transducers having a spacing therebetween that is equal to the offset between the transducers in each transducer pair in the array.

15. An apparatus as recited in claim 14, wherein the servo transducers in the at least one pair of servo transducers are coplanar.

16. An apparatus as recited in claim 15, wherein the servo transducers in the at least one pair of servo transducers is substantially aligned with the first transducers of the associated array along the axes of the arrays.

17. An apparatus as recited in claim 14, wherein the at least one pair of servo transducers share a common longitudinal bias material.

18. An apparatus as recited in claim 14, wherein the at least one pair of servo transducers share a common shield.

19. An apparatus as recited in claim 13, further comprising a mechanism for orienting the modules to control a transducer pitch presented to a tape.

20. An apparatus as recited in claim 13, wherein the modules have about identical construction and originate from a same wafer.

* * * * *